(12) United States Patent
Kanai et al.

(10) Patent No.: US 11,217,793 B2
(45) Date of Patent: Jan. 4, 2022

(54) ELECTRODE, SECONDARY BATTERY, BATTERY PACK, AND VEHICLE

(71) Applicant: KABUSHIKI KAISHA TOSHIBA, Minato-ku (JP)

(72) Inventors: Yuta Kanai, Tokyo (JP); Tetsuya Sasakawa, Yokohama (JP); Keigo Hoshina, Yokohama (JP); Yasuhiro Harada, Isehara (JP); Norio Takami, Yokohama (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 155 days.

(21) Appl. No.: 16/804,546

(22) Filed: Feb. 28, 2020

(65) Prior Publication Data

US 2021/0083297 A1 Mar. 18, 2021

(30) Foreign Application Priority Data

Sep. 17, 2019 (JP) .............................. JP2019-168335

(51) Int. Cl.
*H01M 4/131* (2010.01)
*H01M 4/66* (2006.01)
*B60W 30/18* (2012.01)
*H01M 10/42* (2006.01)
*H01M 50/20* (2021.01)

(52) U.S. Cl.
CPC ...... *H01M 4/661* (2013.01); *B60W 30/18127* (2013.01); *H01M 4/131* (2013.01); *H01M 10/425* (2013.01); *H01M 50/20* (2021.01); *H01M 2220/20* (2013.01)

(58) Field of Classification Search
None
See application file for complete search history.

(56) References Cited

U.S. PATENT DOCUMENTS 10,236,501 B2    3/2019  Takami et al.
2015/0010820 A1* 1/2015  Takami ............... H01M 10/05
                                                    429/221

FOREIGN PATENT DOCUMENTS

JP          6524158 B2    6/2019

* cited by examiner

*Primary Examiner* — Wyatt P Mcconnell
(74) *Attorney, Agent, or Firm* — Oblon, McClelland, Maier & Neustadt, L.L.P.

(57) ABSTRACT

According to one embodiment, an electrode is provided. The electrode includes the active material-containing layer formed on the current collector and including active material particles. The particle size distribution chart obtained by the laser diffraction scattering method for the active material particles includes the first region and the second region. The first particle group included in the first region includes the first active material particles, and the second particle group included in the second region includes second active material particles. The carbon coverage of the first particle group is higher than the carbon coverage of the second particle group.

15 Claims, 7 Drawing Sheets

ELECTRODE, SECONDARY BATTERY, BATTERY PACK, AND VEHICLE

CROSS-REFERENCE TO RELATED APPLICATIONS

This application is based upon and claims the benefit of priority from Japanese Patent Application No. 2019-168335, filed Sep. 17, 2019, the entire contents of which are incorporated herein by reference.

FIELD

Embodiments described herein relate generally to an electrode, a secondary battery, a battery pack, and a vehicle.

BACKGROUND

Recently, secondary batteries, such as a nonaqueous electrolyte secondary battery like a lithium ion secondary battery, have been actively researched and developed as a high energy-density battery. The secondary batteries, such as a nonaqueous electrolyte secondary battery, are anticipated as a power source for vehicles such as hybrid electric automobiles, electric cars, an uninterruptible power supply for base stations for portable telephones, or the like. Therefore, the secondary battery is demanded to, in addition to having a high energy density, be excellent in other performances such as rapid charge-discharge performances and long-term reliability, as well. For example, not only is the charging time remarkably shortened in a secondary battery capable of rapid charge and discharge, but the battery is also capable of improving motive performances in vehicles such as hybrid electric automobiles, and efficient recovery of regenerative energy of motive force.

In order to enable rapid charge/discharge, electrons and lithium ions must be able to migrate rapidly between the positive electrode and the negative electrode. However, when a battery using a carbon-based negative electrode is repeatedly subjected to rapid charge and discharge, precipitation of dendrite of metallic lithium on the electrode may sometimes occur, raising concern of heat generation or ignition due to internal short circuits.

In light of this, a battery using a metal composite oxide in a negative electrode in place of a carbonaceous material has been developed. In particular, in a battery using an oxide of titanium in the negative electrode, rapid charge and discharge can be stably performed. Such a battery also has a longer life than in the case of using a carbon-based negative electrode.

However, compared to carbonaceous materials, oxides of titanium have a higher potential relative to metallic lithium. That is, oxides of titanium are more noble. Furthermore, oxides of titanium have a lower capacity per weight. Therefore, a battery using an oxide of titanium for the negative electrode has a problem that the energy density is low.

For example, the electrode potential an oxide of titanium is about 1.5 V (vs. Li/Li$^+$) relative to metallic lithium, which is higher (i.e., more noble) in comparison to potentials of carbon based negative electrodes. The potential of an oxide of titanium is attributed to the redox reaction between Ti$^{3+}$ and Ti$^{4+}$ upon electrochemical insertion and extraction of lithium, and is therefore electrochemically restricted. It is also a fact that rapid charge/discharge of lithium ions can be performed stably at a high electrode potential of about 1.5 V (vs. Li/Li$^+$).

On the other hand, considering the capacity per unit weight, the theoretical capacity of titanium dioxide (anatase structure) is about 165 mAh/g, and the theoretical capacity of spinel type lithium-titanium composite oxides such as $Li_4Ti_5O_{12}$ is about 180 mAh/g. On the other hand, the theoretical capacity of a general graphite based electrode material is 385 mAh/g and greater. As such, the capacity density of an oxide of titanium is significantly lower than that of the carbon based negative electrode material. This is due to there being only a small number of lithium-insertion sites in the crystal structure, and lithium tending to be stabilized in the structure, and thus, substantial capacity being reduced.

In consideration of the above, a new electrode material containing Ti and Nb has been examined. Such a material containing a niobium-titanium composite oxide is expected to have a high charge☐and☐discharge capacity. Particularly, a composite oxide represented by $TiNb_2O_7$ has a high theoretical capacity exceeding 380 mAh/g. Therefore, the niobium-titanium composite oxide has been expected as a high-capacity material substituted for $Li_4Ti_5O_{12}$; however, there is a problem in that the speed of deterioration of cycle life characteristics varies depending on the size of particles.

DETAILED DESCRIPTION

Figure 1:
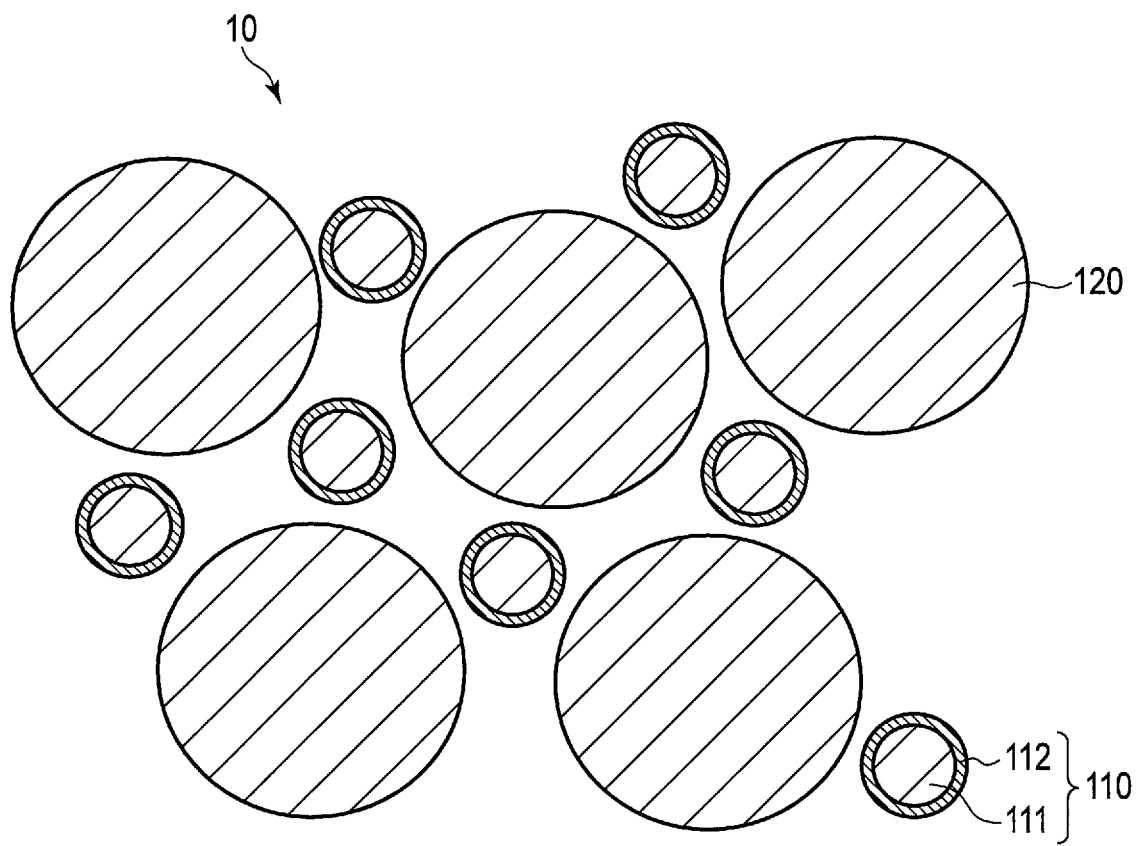
FIG. 1 is a cross-sectional view schematically illustrating an example of the inside of an active material-containing layer contained in an electrode according to an embodiment.

According to the first embodiment, an electrode is provided. The electrode includes the current collector, and the active material-containing layer formed on the current collector and including active material particles. The active material particles include first active material particles including core particles containing a monoclinic niobium-titanium composite oxide, and a carbon material layer with which at least a part of surfaces of the core particles is coated. The active material particles further include second active material particles containing the monoclinic niobium-titanium composite oxide. The particle size distribution chart obtained by the laser diffraction scattering method for the active material particles includes the first region corresponding to the particle size of smaller than the median diameter d50 and the second region corresponding to the particle size of the median diameter d50 or larger. The first particle group included in the first region includes the first active material particles, and the second particle group included in the second region includes second active material particles. The carbon coverage of the first particle group is higher than the carbon coverage of the second particle group.

According to another embodiment, a secondary battery is provided. The secondary battery includes the electrode according to the embodiment.

According to another embodiment, a battery pack is provided. The battery pack includes the secondary battery according to the embodiment.

According to another embodiment, a vehicle is provided. The vehicle includes the battery pack according to the embodiment.

Hereinafter, embodiments will be described with reference to the drawings. The same reference signs are applied to common components throughout the embodiments and overlapped explanations are thereby omitted. Each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

According to a first embodiment, an electrode is provided. The electrode includes the current collector, and the active material-containing layer formed on the current collector and including active material particles. The active material particles include first active material particles including core particles containing a monoclinic niobium-titanium composite oxide, and a carbon material layer with which at least a part of surfaces of the core particles is coated. The active material particles further include second active material particles containing the monoclinic niobium-titanium composite oxide. The particle size distribution chart obtained by the laser diffraction scattering method for the active material particles includes the first region corresponding to the particle size of smaller than the median diameter d50 and the second region corresponding to the particle size of the median diameter d50 or larger. The first particle group included in the first region includes the first active material particles, and the second particle group included in the second region includes second active material particles. The carbon coverage of the first particle group is higher than the carbon coverage of the second particle group.

When the active material particles included in the active material-containing layer are bimodal in which a small particle group and a large particle group are mixed, the electrode density is easily improved. This is presumably because small particles easily enter gaps between large particles. When the electrode density is improved, a volume energy density can be improved. In a case of a non-bimodal form, the particle sizes of the active material particles are nearly equivalent to each other, so that the number of particles entering the gap between the particles is small, and it is difficult to improve the electrode density.

However, there is a problem in that the active material particles having a small particle size are easily deteriorated electrochemically as compared with the active material particles having a large particle size. As this factor, for example, it is conceivable that a specific surface area is large, so that it is easily affected by a side reaction with the electrolyte, and that lithium ions pass frequently. Therefore, when the small particles and the large particles are mixed, the electrode density can be increased, but since the deterioration of the small particles proceeds quickly, there is a problem in that the battery capacity decreases (decreases the capacity retention ratio) earlier in a case where a charge☐and☐discharge cycle is repeated.

Therefore, in the electrode according to the embodiment, among the active material particles included in the active material-containing layer, a small particle group having a relatively small particle size mainly includes particles coated with a carbon material layer. On the other hand, among the active material particles, a large particle group having a relatively large particle size mainly includes particles that are not coated with the carbon material layer.

Specifically, in the particle size distribution chart obtained by the laser diffraction scattering method for the active material-containing layer, when a region corresponding to the particle size of the active material particles smaller than the median diameter d50 is defined as the first region, and a region corresponding to the particle size of the median diameter d50 or larger is defined as the second region, the carbon coverage of the first particle group included in the first region is higher than the carbon coverage of the second particle group included in the second region. A method for performing the laser diffraction scattering method on the active material-containing layer and a specific method for measuring the carbon coverage of the first particle group and the second particle group will be described later.

In the present specification and claims, all particles included in the first region are referred to as a first particle group, and all particles included in the second particle group are referred to as a second particle group.

Since the carbon coverage of the first particle group having a large specific surface area is higher than the carbon coverage of the second particle group, the side reactions with the electrolyte on the surfaces of the active material particles contained in the first particle group can be reduced, and deterioration of the active material particles can be suppressed. On the contrary, in a case where the carbon coverage of the second particle group is higher than the carbon coverage of the first particle group, since the deterioration of the small particle group tends to proceed when the charge☐and☐discharge cycle is repeated, and the volume occupied by the carbon material layer included in the second particle group is large, the energy density tends to be deteriorated.

The carbon coverage of the first particle group is, for example, in a range from 30% to 100%, and preferably in a range from 60% to 100%. When the carbon coverage of the first particle group is 30% or more, since the effect of protecting the active material particles by the carbon material layer is high, excellent cycle life characteristics can be achieved. A higher carbon coverage of the first particle group is preferable because excellent cycle life characteristics tend to be achieved.

The carbon coverage of the second particle group is, for example, in a range from 0% to 50%, preferably in a range from 0% to 30%, and more preferably in a range from 0% to 20%. The carbon coverage of the second particle group may be 0%. By reducing the carbon coverage of the second particle group as compared with the carbon coverage of the first particle group, the volume occupied by the carbon material layer in the active material-containing layer is reduced, so that the electrode density can be increased. As a result, high energy density tends to be achieved. If the carbon coverage of the second particle group is excessively high, the electrode is less likely to be flattened by pressing at the time of electrode production, so that the electrode density is less likely to be increased, and as a result, the high energy density may not be achieved. The reason why the electrode is less likely to be flattened is considered to be, for example, the presence of coarse particles from which the carbon material layer has been peeled off.

The active material particles included in the active material-containing layer include first active material particles and second active material particles. The first active material particles include core particles containing a monoclinic niobium-titanium composite oxide, and a carbon material layer with which at least a part of the surfaces of the core particles is coated. The first active material particles are contained in the active material-containing layer as particles coated with a carbon material layer. The core particles may be formed of a monoclinic niobium-titanium composite oxide. 50% or more of the area of the core particles surfaces may be coated with the carbon material layer. 80% or more of the area of the core particles surfaces may be coated with the carbon material layer. 100% of the area of the core particles surfaces may be coated with the carbon material layer.

The active material particles also include second active material particles including a monoclinic niobium-titanium composite oxide as particles not coated with the carbon material layer. The second active material particles are, for example, particles in which the monoclinic niobium-titanium composite oxide is exposed to the entire surface. The second active material particles may be formed of the monoclinic niobium-titanium composite oxide. The type of the monoclinic niobium-titanium composite oxide contained in the first active material particles (core particles) may be the same as or different from the type of the monoclinic niobium-titanium composite oxide contained in the second active material particles.

When the active material particles contain the monoclinic niobium-titanium composite oxide, high rate performance can be achieved in addition to the excellent energy density. The reason for this will be described by taking $Nb_2TiO_7$, which is a kind of monoclinic niobium-titanium composite oxide, as an example. A crystal structure of $Nb_2TiO_7$ has a large equivalent insertion space for lithium ions and is structurally stable. Furthermore, there are regions having a two-dimensional channel in which lithium ions diffuse rapidly and a conductive path in a [001] direction, connecting between the regions. As a result, in the crystal structure of the monoclinic niobium-titanium composite oxide $Nb_2TiO_7$, insertion/extraction property of the lithium ions into an insertion space is improved and an insertion/extraction space of the lithium ions is effectively increased. As a result, it is possible to provide high capacity and high rate performance.

The monoclinic niobium-titanium composite oxide is, for example, at least one selected from the group consisting of a composite oxide represented by General Formula $Li_xTi_{1-y}M1_yNb_{2-z}M2_zO_{7+\delta}$, and a composite oxide represented by General Formula $Li_xTi_{1-y}M3_{y+z}Nb_{2-z}O_{7-\delta}$. Here, M1 is at least one selected from the group consisting of Zr, Si, and Sn. M2 is at least one selected from the group consisting of V, Ta, and Bi. M3 is at least one selected from the group consisting of Mg, Fe, Ni, Co, W, Ta, and Mo. Each subscript in the composition formula satisfies $0 \leq x \leq 5$, $0 \leq y < 1$, $0 \leq z < 2$, and $-0.3 \leq \delta \leq 0.3$.

Specific examples of the monoclinic niobium-titanium composite oxides include $Nb_2TiO_7$, $Nb_2Ti_2O_9$, $Nb_{10}Ti_2O_{29}$, $Nb_{14}TiO_{37}$, and $Nb_{24}TiO_{62}$. The monoclinic niobium-titanium composite oxide may be a substituted niobium-titanium composite oxide in which at least a part of Nb and/or Ti is substituted with a dopant. Examples of substitution elements are Na, K, Ca, Co, Ni, Si, P, V, Cr, Mo, Ta, Zr, Mn, Fe, Mg, B, Pb, and Al. The substituted niobium-titanium composite oxide may include one kind or two or more kinds of the substitution elements.

In the particle size distribution chart obtained by the laser diffraction scattering method for the active material-containing layer, the median diameter d50 of the active material particles is, for example, in a range of 0.5 μm to 5.0 μm, and preferably in the range of 1.0 μm to 2.0 μm. When the median diameter is within this range, it is preferable because a high capacity density is easily achieved due to the electrode density being easily increased at the time of electrode pressing.

The first region has, for example, a particle size in a range of 0.01 μm or larger and smaller than the median diameter d50. When the lower limit of the first region is 0.01 μm or more, the reactivity with the electrolyte does not become excessively high, and an electrode having excellent life characteristics can be obtained. In the second region, for example, the particle size is in a range of median diameter or more and 50 μm or less. When the particle size of the second region is within this range, the electrode density is easily increased.

In a case where the particle size distribution chart for the active material-containing layer has at least one peak in the first region and also has at least one peak in the second region, when the electrode is manufactured, it is easy to increase the density of the active material-containing layer with a predetermined pressing pressure. As a result, a high electrode density is easily obtained. The reason for this is that the particles of the first particle group having a relatively uniform particle size are likely to enter the gap between the second particle groups having a relatively uniform particle size.

Assuming that a peak indicating the maximum frequency in the first region is a peak P1, a mode diameter in the first region corresponds to the particle size of the peak P1. The mode diameter appearing in the first region is, for example, in a range of 0.05 μm to 2.0 μm, preferably in a range of 0.15 μm to 2.0 μm, and more preferably in a range of 0.3 μm to 2.0 μm. When the mode diameter appearing in the first region is excessively small, the reactivity with the electrolyte becomes excessively high, and the life characteristics may be lowered. When the mode diameter appearing in the first region is excessively large, there are many active material particles having a relatively large particle size. In the case of active material particles having a relatively large particle size, a center portion of the active material particle is less likely to be used as compared with the outside, and the utilization ratio of the active material tends to vary within the particle. As a result, the life characteristics of the electrode as a whole may be deteriorated. In addition, the electrode density tends to decrease.

Further, assuming that a peak indicating the maximum frequency in the second region is a peak P2, a mode diameter in the second region corresponds to the particle size of the peak P2. The mode diameter appearing in the second region is, for example, in a range of 2.0 μm to 20 μm, and preferably in a range of 3.0 μm to 10 μm. If the mode diameter appearing in the second region is excessively small, the electrode density may be reduced. When the mode diameter appearing in the second region is excessively large, there are many active material particles having a relatively large particle size. In the case of active material particles having a relatively large particle size, a center portion of the active material particle is less likely to be used as compared with the outside, and the utilization ratio of the active material tends to vary within the particle. As a result, the life characteristics of the electrode as a whole may be deteriorated. Moreover, since the electrode density tends to be small, it is difficult to obtain excellent discharge rate characteristics and high capacity.

If the positions where the peaks P1 and P2 appear are excessively close to each other, it is difficult to obtain an effect of improving the electrode density.

A frequency (%) of the peak P1 is in a range of 0.5% to 10%, for example. A frequency (%) of peak P2 is in a range of 0.5% to 10%, for example.

The first particle group included in the first region can include the first active material particles including a carbon material layer and the second active material particles. The second particle group included in the second region can include the first active material particles including a carbon material layer and the second active material particles. An average particle size of the first active material particles is, for example, smaller than an average particle size of the second active material particles. Here, the average particle size means the median diameter d50.

The first particle group may include more first active material particles than the second active material particles, on a mass basis. The second particle group may include more second active material particles than the first active material particles, on a mass basis. A proportion of the first active material particles in the first particle group is, for example, in a range of 50% by mass to 100% by mass, and a proportion of the second active material particles is, for example, in a range of 0% by mass to 50% by mass. A proportion of the first active material particles in the second particle group is, for example, in a range of 0% by mass to 45% by mass, and a proportion of the second active material particles is, for example, in a range of 55% by mass to 100% by mass.

A BET specific surface area of the first particle group is, for example, in a range from 3 $m^2/g$ to 200 $m^2/g$, and preferably in a range from 4 $m^2/g$ to 180 $m^2/g$. When the BET specific surface area of the first particle group is within this range, the reactivity between the first particle group and the electrolyte does not become excessively high, and the life characteristics can be improved. In addition, since a sufficient contact area between the first particle group and the electrolyte can be secured, excellent discharge rate characteristics can be easily obtained, and the charging time can be shortened.

The BET specific surface area of the second particle group is, for example, in a range from 0.1 $m^2/g$ to 100 $m^2/g$, and preferably in a range from 0.2 $m^2/g$ to 90 $m^2/g$. When the BET specific surface area of the second particle group is within this range, the reactivity between the second particle group and the electrolyte does not become excessively high, and the life characteristics can be improved. In addition, since a sufficient contact area between the second particle group and the electrolyte can be secured, excellent discharge rate characteristics can be easily obtained, and the charging time can be shortened.

The specific surface area is measured by a method in which molecules having a known adsorption occupation area are adsorbed on the powder particle surface at the temperature of liquid nitrogen and the specific surface area of the sample is obtained from the amount. The BET method based on low-temperature, low-humidity physical adsorption of inert gas is most often used. This BET method is based on the BET theory, which is the most famous theory for calculating the specific surface area, by expanding the Langmuir theory, which is a monolayer adsorption theory, to multi-layer adsorption. The specific surface area determined in this way is referred to as the BET specific surface area.

As described in particle size distribution measurement by the laser diffraction scattering method described later and carbon coverage measurement, the specific surface areas of the first particle group and the second particle group can be measured by separating the active material particles contained in the electrode into the first particle group and the second particle group, and then applying a BET method to each group.

The active material particles included in the first particle group may be included in the active material-containing layer in the form of primary particles, or included in the active material-containing layer in the form of secondary particles formed by aggregation of the primary particles. The active material particles included in the second particle group may be included in the active material-containing layer in the form of primary particles, or included in the active material-containing layer in the form of secondary particles formed by aggregation of the primary particles.

Whether the active material particles are secondary particles or primary particles can be determined by observation with a scanning electron microscope (SEM).

The electrode density is, for example, in a range of 2.5 $g/cm^3$ to 2.9 $g/cm^3$, and preferably in a range of 2.6 $g/cm^3$ to 2.8 $g/cm^3$. When the electrode density is excessively low, an electron conductive path is insufficient, so that the entire active material particles contained in the active material layer are hardly deteriorated uniformly. Therefore, the capacity retention ratio tends to decrease when the charge☐and☐discharge cycle is repeated. When the electrode density is excessively high, the impregnation property of the electrolyte is poor. Therefore, the capacity retention ratio tends to decrease when the charge☐and☐discharge cycle is repeated.

Hereinafter, the electrode according to the embodiment will be described in detail.

The electrode according to the embodiment can include a current collector and an active material-containing layer. The active material-containing layer can be formed on one surface or both surfaces of the current collector. The active material-containing layer can optionally contain a conductive agent and a binder, in addition to the active material particle. The electrode according to the embodiment may be a negative electrode or a positive electrode. The electrode according to the embodiment is, for example, an electrode for a battery or an electrode for a secondary battery.

The active material-containing layer can contain other active material particles that do not contain the monoclinic niobium-titanium composite oxide. The active material particles include, for example, active material particles containing the monoclinic niobium-titanium composite oxide in a proportion of 70% by mass or more, and preferably 90% by mass or more. Note that the mass of the active material particles containing the monoclinic niobium-titanium composite oxide is the total mass of the first active material particles and the second active material particles described above.

Examples of other active materials include lithium titanate having a ramsdellite structure (for example, $Li_{2+y}Ti_3O_7$, $0≤y≤3$), lithium titanate having a spinel structure (for example, $Li_{4+x}Ti_5O_{12}$, $0 \leq x \leq 3$), monoclinic titanium dioxide ($TiO_2$), anatase titanium dioxide, rutile titanium dioxide, hollandite titanium composite oxide, and orthorhombic titanium composite oxide.

Examples of the orthorhombic titanium-containing composite oxide include a compound represented by $Li_{2+a}M(I)_{2-b}Ti_{6-c}M(II)_dO_{14+\sigma}$. Here, M(I) is at least one selected from the group consisting of Sr, Ba, Ca, Mg, Na, Cs, Rb, and K. M(II) is at least one selected from the group consisting of Zr, Sn, V, Nb, Ta, Mo, W, Y, Fe, Co, Cr, Mn, Ni and Al. The respective subscripts in the composition formula are specified as follows: $0 \leq a \leq 6$, $0 \leq b < 2$, $0 \leq c < 6$, $0 \leq d < 6$, and $-0.5 \leq \sigma \leq 0.5$. Specific examples of the orthorhombic titanium-containing composite oxide include $Li_{2+a}Na_2Ti_6O_{14}$ ($0 \leq a \leq 6$).

The electro-conductive agent is added to improve current collection performance and to suppress the contact resistance between the active material and the current collector. Examples of the electro-conductive agent include carbonaceous substances such as vapor grown carbon fiber (VGCF), carbon blacks such as acetylene black, and graphite. One of these may be used as the electro-conductive agent, or two or more may be used in combination as the electro-conductive agent. Alternatively, instead of using an electro-conductive agent, a carbon coating or an electro-conductive inorganic material coating may be applied to the surface of the active material particle.

The binder is added to fill gaps among the dispersed active material and also to bind the active material with the current collector. Examples of the binder include polytetrafluoroethylene (PTFE), polyvinylidene fluoride (PVdF), fluorine rubber, styrene-butadiene rubber, polyacrylate compounds, imide compounds, carboxymethyl cellulose (CMC), and salts of CMC. One of these may be used as the binder, or two or more may be used in combination as the binder.

The mixing ratio of the active material particles, the conductive agent, and the binder in the active material-containing layer can be appropriately changed according to the use of the electrode. For example, the mixing ratio is as follows. The active material-containing layer contains active material particles, a conductive agent, and a binder in a proportion of preferably in ranges from 68% by mass to 96% by mass, from 2% by mass to 30% by mass, and from 2% by mass to 30% by mass, respectively. By setting the amount of the conductive agent to 2% by mass or more, the current collecting performance of the active material-containing layer can be improved. Further, by setting the amount of the binder to 2% by mass or more, the binding property between the active material-containing layer and the current collector becomes sufficient, and the excellent cycle performance can be expected. On the other hand, the conductive agent and the binder are each preferably 30% by mass or less in order to increase the capacity.

There may be used for the current collector, a material which is electrochemically stable at the potential at which lithium (Li) is inserted into and extracted from active material. For example, in the case where the electrode according to the embodiment acts as a negative electrode, the current collector is preferably made of copper, nickel, stainless steel, aluminum, or an aluminum alloy including one or more elements selected from the group consisting of Mg, Ti, Zn, Mn, Fe, Cu, and Si. The thickness of the current collector is preferably in the range of 5 μm to 20 μm. The current collector having such a thickness can maintain balance between the strength and weight reduction of the electrode.

The current collector may include a portion where the active material-containing layer is not formed on a surface of the current collector. This portion may serve as an electrode tab.

<Measurement of Particle Size Distribution by Laser Diffraction Scattering Method>

The particle size distribution chart of the active material-containing layer included in the electrode according to the embodiment can be obtained by performing measurement according to the following procedure.

In a case where the electrode is incorporated in the battery as a negative electrode, the battery is first discharged and then the negative electrode is removed from the battery. The operation of removing the negative electrode is performed in an inert atmosphere such as an argon atmosphere. Thereafter, the negative electrode is immersed in ethyl methyl carbonate to remove the Li salt and then dried. For the dried electrode, only the negative electrode active material-containing layer is peeled off from the current collector with a spatula, and the peeled negative electrode active material-containing layer is dispersed in a solvent such as N-methyl-2-pyrrolidone (NMP). Thereafter, the centrifuge is used to separate the active material particles from the conductive agent and the binder.

The separated active material particles are dispersed in N-methyl-2-pyrrolidone (NMP) solvent and subjected to ultrasonic treatment to obtain a dispersion solution as a sample for particle size distribution measurement. With respect to this dispersion solution, the particle size distribution of the constituent particles is measured using a laser diffraction type distribution measuring apparatus. As a measuring apparatus, for example, Microtrac MT3100II manufactured by MicrotracBEL Corp. can be used.

An ultrasonic treatment for obtaining the dispersion solvent is performed by a sample supply system attached to the laser diffraction type distribution measuring apparatus. The ultrasonic treatment is carried out for 300 seconds at a power of 40 W.

A particle size distribution chart for the active material particles is obtained by the above measurement. The particle size distribution chart is a graph in which a horizontal axis indicates a particle size [μm], and a vertical axis indicates a frequency (frequency distribution) [%] and the cumulative frequency distribution [%]. From the obtained particle size distribution chart, the median diameter d50 of the active material particles can be determined. Further, the particle size and the frequency corresponding to the peak position of the peak appearing in the particle size distribution chart are clarified.

<Measurement of Carbon Coverage>

The coverage of the surfaces of the active material particles by the carbon material layer can be determined from a mapping image obtained by a transmission electron microscope (TEM) and an energy dispersive x-ray spectrometry (EDX). A specific procedure will be described below.

The active material particles separated by the method described in the above particle size distribution measurement are used as measurement objects. A membrane filter or a micro-sieve pore size with the same pore size as the median diameter d50 that is clarified by the particle size distribution measurement is prepared. The active material particles to be measured are separated into a first particle group having a small particle size and a second particle group having a large particle size by filtration using a membrane filter or a micro sieve. By performing the measurement by TEM-EDX for each of the first particle group and the second particle group, the carbon coverage of the first particle group and the carbon coverage of the second particle group can be determined. Specifically, this will be described below.

The first particle group as a sample is dispersed in a solvent such as ethanol or NMP, and this dispersion is dropped on a microgrid to prepare a sample.

The prepared sample is observed using TEM at 500,000 times magnification. By performing element mapping analysis by EDX on the same analysis range, it is possible to discriminate between core particles containing monoclinic niobium-titanium composite oxide and carbon material layers. The particles containing the monoclinic niobium-titanium composite oxide can be identified by elemental mapping of constituent elements Ti and Ni, and the carbon material layer can be identified by mapping carbon (C).

Next, the coverage with the carbon material layer on the surfaces of the active material particles is obtained. Among the active material particles confirmed by the TEM measurement and the EDX analysis of the active material, the largest particle and the smallest particle are excluded. For the active material particles other than the largest particle and the smallest particle, the mapping image of C element derived from the carbon material layers in the outer peripheral portions of the particles is binarized. Furthermore, the value obtained by determining the abundance ratio of C element is defined as the coverage with the carbon material layers. This coverage measurement is performed on 100 particles observed at random, and the coverage obtained for each particle is averaged to determine the carbon coverage for each of the first particle group and the second particle group.

More specifically, when the image is observed, for the particles determined as primary particles of the active material in the binarized image, first, the outer peripheral length of the primary particles in the image and the outer peripheral length of the portion where C element is present are calculated. Next, the coverage (percentage) of the active material particles by the carbon material layer is calculated according to the following formula. (Outer peripheral length of portion where C element is present in outer periphery of primary particles)/(Length of outer periphery of primary particles)× 100.

In addition, for the particles determined to be secondary particles of the active material in the binarized image, first, the outer peripheral length of the secondary particles in the image and the outer peripheral length of the portion where C element is present are calculated. A side where the secondary particles are in contact with a constituent material other than the active material is defined as an outside of the secondary particles. In the binarized image, the outline of the outside of the secondary particles is defined as an outer periphery of the secondary particles. Next, the coverage (percentage) of the active material particles by the carbon material layer is calculated according to the following formula. (Outer periphery length of portion where C element is present in outer periphery of secondary particles)/(Length of outer periphery of secondary particles)×100

In addition, in a case where the primary particle or secondary particle included in the active material particles do not fit on a screen at the magnification, the carbon coverage of the first particle group by the above procedure can be measured by merging the images so that the outer periphery can be discriminated.

The carbon coverage of the second particle group can also be measured by the same procedure as described above.

<Powder X-Ray Diffraction>

The crystal structure of the niobium-titanium composite oxide in the active material particles can be confirmed by powder X-ray diffraction (XRD). As an apparatus for powder X-ray diffraction measurement, for example, SmartLab manufactured by Rigaku Corporation or an apparatus having an equivalent function is used. The measurement conditions are as follows:

X-ray source: Cu target
Output: 45 kV 200 mA
Solar slit: 5° for both incident and reception
Step width (2θ): 0.02 deg
Scan speed: 20 deg/min
Semiconductor detector: D/teX Ultra 250
Sample plate holder: Flat glass sample plate holder (thickness 0.5 mm)
Measurement range: $5° \leq 2\theta \leq 90°$ <Method for Manufacturing Electrode>

An electrode can be produced, for example, by the following method.

First, as a starting material for a monoclinic niobium-titanium composite oxide, for example, commercially available $TiO_2$ powder and $Nb_2O_5$ powder are prepared. These powders are separated into a small particle group and a large particle group, respectively, using a membrane filter having an appropriate pore size. As the membrane filter, for example, a filter having a pore size in a range of 0.2 μm to 1 μm is used.

$TiO_2$ powder obtained as a large particle group and $Nb_2O_5$ powder obtained as a large particle group are mixed so that the raw material molar ratio is, for example, 1:1 to 1:12. Using the obtained mixture as a raw material, active material particles (second active material particles) containing the monoclinic niobium-titanium composite oxide can be obtained by a solid phase synthesis method. The second active material particles obtained in this manner use the large particle group of $TiO_2$ powder and the large particle group of $Nb_2O_5$ powder as starting materials, and thus tend to have a large active material particle size. The second active material particles are not subjected to a carbon coating treatment as described later.

On the other hand, $TiO_2$ powder obtained as the small particle group and $Nb_2O_5$ powder obtained as the small particle group are mixed so that a raw material molar ratio is, for example, 1:1 to 1:12. Using the obtained mixture as a raw material, active material particles containing the monoclinic niobium-titanium composite oxide can be obtained by a solid phase synthesis method. A carbon material layer can be formed on the surfaces of the core particles by applying the carbon coating treatment described later using the active material particles thus obtained as core particles.

When the core particles contained in the second active material particles and the first active material particles is manufactured, a firing temperature and time at the time of solid phase synthesis are changed, or pulverization conditions after the synthesis are adjusted so as to change the property of the obtained active material particles. For example, by increasing the firing time, particles having a large average particle size can be obtained. By this adjustment, the position of the mode diameters of the first region and the second region can be changed with respect to the active material particles obtained after mixing the first active material particles and the second active material particles.

In the carbon coating treatment for the core particles, first, a carbon source and pure water are mixed and sufficiently stirred to prepare a carbon source aqueous solution. Examples of the carbon source include saccharides such as sucrose, maltose and glucose, polyolefins, nitriles, alcohols such as polyvinyl alcohol (PVA), organic compounds containing a benzene ring, aromatic hydrocarbons such as pyrene, naphthalene and chrysene, and mixtures of these. PVA is preferably used as the carbon source. When PVA is used as the carbon source, the dispersibility of a carbon body on the surfaces of the monoclinic niobium-titanium composite oxide particles tends to be increased.

Next, this carbon source aqueous solution and the core particles obtained by the above-described method are mixed to prepare a dispersion. The amount of the carbon source with respect to 100 parts by mass of the active material is preferably in a range from 1 part by mass to 15 parts by mass, and more preferably in a range from 2 parts by mass to 10 parts by mass.

The dispersion is subjected to spray drying to obtain a powder sample. Further, the obtained powder sample is dried at a temperature range from 70° C. to 200° C. for a range from 1 minute to 1 hour. In this way, active material particles carrying an unfired carbon body are obtained.

Thereafter, the active material particles carrying the unfired carbon body are subjected to firing in an inert atmosphere to perform a carbonization treatment. As the gas for the inert atmosphere, for example, nitrogen gas, carbon dioxide gas, or argon gas can be used. The firing time is, for example, in a range from 1 hour to 5 hours. The firing temperature is preferably in a range from 650° C. to 850° C., and more preferably in a range from 700° C. to 800° C. When the firing temperature is high, the crystallinity of the carbon body tends to be increased. In this manner, the first active material particles in which the carbon material layer is formed on at least a part of the surfaces of the core particles can be obtained. An average particle size d50 of the first active material particles is, for example, smaller than an average particle size d50 of the second active material particles.

Active material particles can be obtained by mixing the produced first active material particles and second active material particles in a mass ratio of, for example, 0.05:99.95 to 5:95. When the first active material particles and the second active material particles are mixed, the larger the amount (mass ratio) of the first active material particles having a small average particle size d50, the smaller the median diameter as the active material particles tends to be, and the larger the amount (mass ratio) of the second active material particles having a large average particle size d50, the larger the median diameter as the active material particles tends to be.

Subsequently, the active material particles, the conductive agent, and the binder prepared by the above procedure are suspended in a solvent to prepare a slurry. This slurry is applied to one surface or both surfaces of the current collector. Next, the applied slurry is dried to obtain a laminate of the active material-containing layer and the current collector. Thereafter, the laminate is subjected to pressing. In this way, an electrode is produced.

Alternatively, an electrode may be produced by the following method. First, the active material particles, the conductive agent, and the binder prepared by the above procedure are mixed to obtain a mixture. The mixture is then formed into pellets. Subsequently, an electrode can be obtained by arranging these pellets on the current collector.

FIG. 1 is a cross-sectional view schematically illustrating of the inside of an active material-containing layer included in an electrode according to the embodiment. An active material-containing layer 10 can include a conductive agent and a binder described later, but the depiction of the conductive agent and the binder is not shown in FIG. 1. The active material-containing layer 10 includes first active material particles 110 and second active material particles 120. The first active material particles 110 include core particles 111 containing a monoclinic niobium-titanium composite oxide and a carbon material layer 112 with which at least a part of the surfaces of the core particles 111 is coated. FIG. 1 illustrates a case where the entire surfaces of the core particles 111 is coated with the carbon material layer 112. As illustrated in FIG. 1, in the active material-containing layer according to the embodiment, for example, the first active material particle 110 having a relatively small particle size has the carbon material layer 112, and the second active material particle 120 having a relatively large particle size does not have the carbon material layer 112. Therefore, the electrode including such an active material-containing layer can provide a secondary battery that can realize a high energy density and excellent cycle life characteristics.

According to the first embodiment, the electrode is provided. The electrode includes the current collector, and the active material-containing layer formed on the current collector and including active material particles. The active material particles include first active material particles including core particles containing a monoclinic niobium-titanium composite oxide, and a carbon material layer with which at least a part of surfaces of the core particles is coated. The active material particles further include second active material particles containing the monoclinic niobium-titanium composite oxide. The particle size distribution chart obtained by the laser diffraction scattering method for the active material particles includes the first region corresponding to the particle size of smaller than the median diameter d50 and the second region corresponding to the particle size of the median diameter d50 or larger. The first particle group included in the first region includes the first active material particles, and the second particle group included in the second region includes second active material particles. The carbon coverage of the first particle group is higher than the carbon coverage of the second particle group.

Therefore, the electrode according to the first embodiment can realize a secondary battery having a high energy density and excellent cycle life characteristics.

Second Embodiment

According to the second embodiment, a secondary battery including a negative electrode, a positive electrode, and an electrolyte is provided. The secondary battery includes the electrode according to the first embodiment as the negative electrode.

The secondary battery additionally can be equipped with a separator disposed between the positive electrode and the negative electrode. The negative electrode, the positive electrode, and the separator can constitute an electrode group. The electrolyte can be held in the electrode group.

The secondary battery additionally can be equipped with a container member that houses the electrode group and the electrolyte.

Furthermore, the secondary battery additionally can be equipped with a negative electrode terminal electrically connected to the negative electrode and a positive electrode terminal electrically connected to the positive electrode.

The secondary battery can be, for example, a lithium secondary battery. The secondary battery may be a nonaqueous electrolyte secondary battery including a nonaqueous electrolyte.

Hereinafter, the negative electrode, the positive electrode, the electrolyte, the separator, the container member, the negative electrode terminal, and the positive electrode terminal will be described in detail.

(1) Negative Electrode

A negative electrode included in the secondary battery according to the second embodiment may be, for example, the electrode described in the first embodiment. The active material-containing layer included in the electrode may be a negative electrode active material layer. The active material particles included in the electrode may be negative electrode active material particles. A polymer fiber layer to be described later can be laminated on the negative electrode active material-containing layer. The negative electrode on which the polymer fiber layer is laminated may be a negative electrode structure.

The negative electrode can be produced, for example, by a method similar to that for the electrode according to the first embodiment.

(2) Positive Electrode

The positive electrode can include a positive electrode current collector and a positive electrode active material-containing layer. The positive electrode active material-containing layer can be formed on one side or both sides of the positive electrode current collector. The positive electrode active material-containing layer can contain a positive electrode active material, and optionally a conductive agent and a binder. A polymer fiber layer, which will be described later, can be laminated on the positive electrode active material-containing layer. The positive electrode on which the polymer fiber layer is laminated may be a positive electrode structure.

Examples of the positive electrode active material include oxides and sulfides. The positive electrode may include, as the positive electrode active material, one type of compound or two or more different types of compounds. Examples of the oxides and the sulfides may include compounds allowing lithium or lithium ions to be inserted thereinto or extracted therefrom.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y<1$, and $Li_xCoPO_4$; $0<x\leq1$), iron sulfates [$Fe_2(SO_4)_3$], vanadium oxides (e.g., $V_2O_5$), and lithium nickel cobalt manganese composite oxides ($Li_xNi_{1-y-z}Co_yMn_zO_2$; $0<x\leq1$, $0<y<1$, $0<z<1$, $y+z<1$).

Among the above, examples of compounds more preferable as the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($Li_xNi_{1-y-z}Co_yMn_zO_2$; $0<x\leq1$, $0<y<1$, $0<z<1$, $y+z<1$). The positive electrode potential can be made high by using these positive electrode active materials.

When a room temperature molten salt is used as the electrolyte of the battery, it is preferable to use a positive electrode active material including lithium iron phosphate, $Li_xVPO_4F$ ($0\leq x\leq1$), lithium manganese composite oxide, lithium nickel composite oxide, lithium nickel cobalt composite oxide, or a mixture thereof. Since these compounds have low reactivity with room temperature molten salts, cycle life can be improved. Details regarding the room temperature molten salt are described later.

The positive electrode active material may preferably have primary particle sizes in the range of 100 nm to 1 μm. The positive electrode active material having primary particle sizes of 100 nm or more may be easy to handle in industrial applications. The positive electrode active material having primary particle sizes of 1 μm or less may allow lithium ions to be smoothly diffused in solid.

The positive electrode active material may preferably have a specific surface area in the range of 0.1 m$^2$/g to 10 m$^2$/g. The positive electrode active material having a specific surface area of 0.1 m$^2$/g or more may secure an adequately large site for insertion and extraction of Li ions. The positive electrode active material having a specific surface area of 10 m$^2$/g or less may be easy to handle in industrial applications and may ensure a favorable charge-and-discharge cycle.

The binder is blended in order to fill a gap between the dispersed positive electrode active materials and to bind the positive electrode active material and the positive electrode current collector. Examples of the binder include polytetrafluoroethylene (PTFE), polyvinylidene fluoride (PVdF), fluorine rubber, polyacrylic acid compounds, imide compounds, carboxy methyl cellulose (CMC), and salts of CMC. One of these may be used as the binder, or a combination of two or more thereof may be used as the binder.

A conductive agent is added in order to increase the current-collecting performance and suppress the contact resistance between the positive electrode active material and the positive electrode current collector. Examples of the conductive agent include carbonaceous matters such as vapor grown carbon fiber (VGCF) and carbon black. Examples of the carbon black include acetylene black and graphite. One of these materials may be used as the conductive agent, or two or more of these materials may be combined and used as the conductive agent. In addition, the conductive agent can be omitted.

In the positive electrode active material-containing layer, it is preferable to combine the positive electrode active material and the binder in a mass ratio of the positive electrode active material in a range from 80% to 98% and the binder in a range from 2% to 20%.

By making the amount of the binder be 2% by mass or greater, sufficient electrode strength is obtained. In addition, the binder may function as an insulator. For this reason, if the amount of the binder is kept at 20% by mass or less, the amount of insulation contained in the electrode is decreased, and therefore the internal resistance can be reduced.

In the case of adding the conductive agent, it is preferable to combine the positive electrode active material, the binder, and the conductive agent in a mass ratio of the positive electrode active material in a range from 77% to 95%, the binder in a range from 2% to 20%, and conductive agent in a range from 3% to 15%.

By making the amount of the conductive agent be 3% by mass or greater, the effects described above can be exhibited.

Also, by keeping the amount of the conductive agent to 15% by mass or less, the proportion of the conductive agent in contact with electrolyte can be lowered. If this proportion is low, decomposition of the electrolyte under high-temperature storage can be reduced.

The positive electrode current collector is preferably an aluminum foil or an aluminum alloy foil containing one or more elements selected from Mg, Ti, Zn, Ni, Cr, Mn, Fe, Cu, and Si.

The thickness of the aluminum foil or aluminum alloy foil is preferably within a range from 5 μm to 20 μm, and is more preferably 15 μm or less. The purity of the aluminum foil is preferably 99% by mass or more. The content of transition metals such as iron, copper, nickel, and chromium contained in the aluminum foil or aluminum alloy foil is preferably 1% by mass or less.

In addition, the positive electrode current collector can include a portion where the positive electrode active material-containing layer is not formed on the surface thereof. This portion can serve as a positive electrode tab.

The positive electrode can be produced, for example, by the following method. First, an active material, a conductive agent, and a binder are suspended in a solvent to prepare a slurry. This slurry is applied to one side or both sides of the current collector. Next, the applied slurry is dried to obtain a laminate of the active material-containing layer and the current collector. Thereafter, the laminate is pressed. The positive electrode is thus produced.

Alternatively, the positive electrode may be produced by the following method. First, an active material, a conductive agent, and a binder are mixed to obtain a mixture. The mixture is then formed into pellets. Subsequently, these pellets can be arranged on the current collector to obtain a positive electrode.

(3) Electrolyte

Examples of the electrolyte may include nonaqueous liquid electrolyte or nonaqueous gel electrolyte. The nonaqueous liquid electrolyte may be prepared by dissolving an electrolyte salt used as solute in an organic solvent. The electrolyte salt may preferably have a concentration in the range of 0.5 mol/L to 2.5 mol/L.

Examples of the electrolyte salt include lithium salts such as lithium perchlorate (LiClO$_4$), lithium hexafluorophosphate (LiPF$_6$), lithium tetrafluoroborate (LiBF$_4$), lithium hexafluoroarsenate (LiAsF$_6$), lithium trifluoromethanesulfonate (LiCF$_3$SO$_3$), and lithium bistrifluoromethylsulfonylimide [LiN(CF$_3$SO$_2$)$_2$], and mixtures thereof. The electrolyte salt is preferably resistant to oxidation even at a high potential, and most preferably LiPF$_6$.

Examples of the organic solvent include cyclic carbonates such as propylene carbonate (PC), ethylene carbonate (EC), or vinylene carbonate (VC); linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2-MeTHF), or dioxolane (DOX); linear ethers such as dimethoxy ethane (DME) or diethoxy ethane (DEE); γ-butyrolactone (GBL), acetonitrile (AN), and sulfolane (SL). These organic solvents may be used singularly or as a mixed solvent.

The gel nonaqueous electrolyte is prepared by obtaining a composite of a liquid nonaqueous electrolyte and a polymeric material. Examples of the polymeric material include polyvinylidene fluoride (PVDF), polyacrylonitrile (PAN), polyethylene oxide (PEO), and mixtures thereof.

Alternatively, besides the nonaqueous liquid electrolyte and the nonaqueous gel electrolyte, a room-temperature molten salt (ionic melt) containing lithium ions, a polymer solid electrolyte, an inorganic solid electrolyte, and the like may also be used as the nonaqueous electrolyte.

The room temperature molten salt (ionic melt) indicates compounds among organic salts made of combinations of organic cations and anions, which are able to exist in a liquid state at room temperature (15° C. to 25° C.). The room temperature molten salt includes a room temperature molten salt which exists alone as a liquid, a room temperature molten salt which becomes a liquid upon mixing with an electrolyte salt, a room temperature molten salt which becomes a liquid when dissolved in an organic solvent, and mixtures thereof. In general, the melting point of the room temperature molten salt used in secondary batteries is 25° C. or below. The organic cations generally have a quaternary ammonium framework.

A polymer solid electrolyte is prepared by dissolving an electrolyte salt into a polymer material and solidifying the result.

An inorganic solid electrolyte is solid material having Li-ion conductivity.

The electrolyte may also be an aqueous electrolyte containing water.

The aqueous electrolyte includes an aqueous solvent and an electrolyte salt. The aqueous electrolyte is liquid, for example. A liquid aqueous electrolyte is an aqueous solution prepared by dissolving an electrolyte salt as the solute in an aqueous solvent. The aqueous solvent is a solvent containing 50% or more water by volume, for example. The aqueous solvent may also be pure water.

The aqueous electrolyte may also be an aqueous gel composite electrolyte containing an aqueous electrolytic solution and a polymer material. The polymer material may be, for example, polyvinylidene fluoride (PVDF), polyacrylonitrile (PAN), or polyethylene oxide (PEO).

The aqueous electrolyte preferably contains 1 mol or greater of aqueous solvent per 1 mol of the salt as the solute. In an even more preferably aspect, the aqueous electrolyte contains 3.5 mol or greater of aqueous solvent per 1 mol of the salt as the solute.

That the aqueous electrolyte contains water can be confirmed by gas chromatography-mass spectrometry (GC-MS) measurement. Also, the salt concentration and the amount of water contained in the aqueous electrolyte can be computed by measurement using inductively coupled plasma (ICP) emission spectroscopy or the like, for example. By measuring out a prescribed amount of the aqueous electrolyte and computing the contained salt concentration, the molar concentration (mol/L) can be computed. Also, by measuring the specific gravity of the aqueous electrolyte, the number of moles of the solute and the solvent can be computed.

The aqueous electrolyte is prepared by dissolving the electrolyte salt into the aqueous solvent at a concentration from 1 to 12 mol/L for example.

To suppress electrolysis of the aqueous electrolyte, LiOH, Li$_2$SO$_4$, or the like can be added to adjust the pH. The pH is preferably from 3 to 13, and more preferably from 4 to 12.

(4) Separator

The separator is formed of, for example, a porous film containing polyethylene (polyethylene; PE), polypropylene (polypropylene; PP), cellulose, or polyvinylidene fluoride (PVdF), or a synthetic resin nonwoven fabric. From the viewpoint of safety, it is preferable to use a porous film formed from polyethylene or polypropylene. This is because these porous films can be melted at a predetermined temperature to interrupt the current.

(5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal case is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylinder, coin, or button-shaped. The container member may be appropriately selected depending on battery size and use of the battery.

(6) Negative Electrode Terminal

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, aluminum, and aluminum alloy containing at least one element selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance with the negative electrode current collector.

(7) Positive Electrode Terminal

The positive electrode terminal may be made of, for example, a material that is electrically stable in the potential range of 3 V to 5 V (vs. Li/Li$^+$) relative to the redox potential of lithium, and has electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance with the positive electrode current collector.

Next, the secondary battery according to the embodiment will be described in detail with reference to the drawings.

Figure 2:
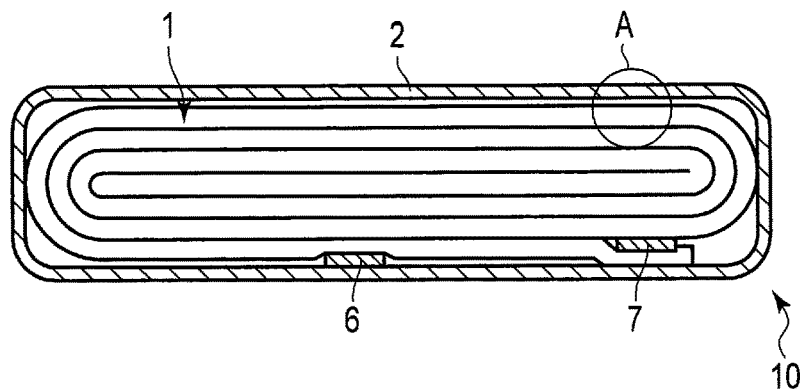
FIG. 2 is a cross-sectional view schematically illustrating an example of a secondary battery according to the embodiment.
Figure 3:
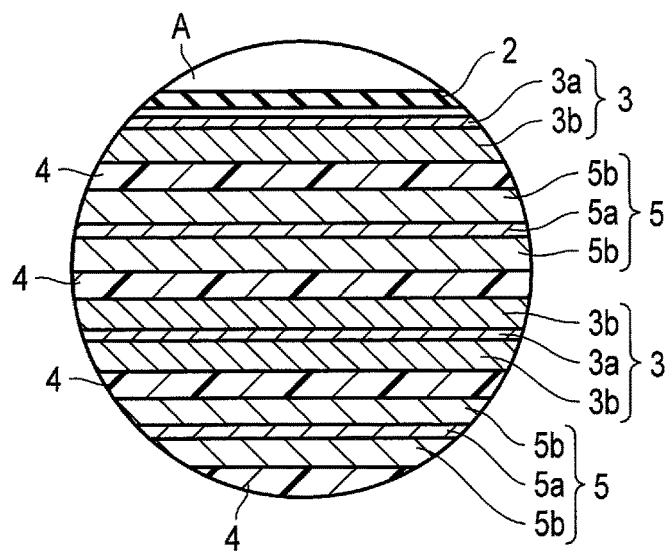
FIG. 3 is an enlarged cross-sectional view of section A of the secondary battery as illustrated in FIG. 2.

FIG. 2 is a sectional view schematically showing one example of a secondary battery according to an embodiment. FIG. 3 is an enlarged sectional view of a portion A of the secondary battery shown in FIG. 2.

The secondary battery 100 shown in FIG. 2 and FIG. 3 includes a bag-shaped container member 2 shown in FIG. 2, an electrode group 1 shown in FIG. 2 and FIG. 3, and an electrolyte (not shown). The electrode group 1 and the electrolyte are stored in the bag-shaped container member 2. The electrolyte (not shown) is held in the electrode group 1.

The bag-shaped container member 2 is formed from a laminate film including two resin layers and a metal layer disposed therebetween.

As shown in FIG. 2, the electrode group 1 is a flat wound electrode group. The flat wound electrode group 1 includes negative electrodes 3, separators 4, and positive electrodes 5 as shown in FIG. 3. The separator 4 is disposed between the negative electrode 3 and the positive electrode 5.

A negative electrode 3 includes a negative electrode current collector 3a and negative electrode active material-containing layers 3b. In the portion of the negative electrode 3 located at the outermost shell of a wound electrode group 1, the negative electrode active material-containing layer 3b is formed only on the inside surface side of the negative electrode current collector 3a, as shown in FIG. 3. In another portion of the negative electrode 3, the negative electrode active material-containing layer 3b is formed on both sides of the negative electrode current collector 3a.

A positive electrode 5 includes a positive electrode current collector 5a and a positive electrode active material-containing layer 5b formed on both sides thereof.

As shown in FIG. 2, a negative electrode terminal 6 and a positive electrode terminal 7 are positioned near the outer end of the wound electrode group 1. The negative electrode terminal 6 is connected to the outermost part of the negative electrode current collector 3a. In addition, the positive electrode terminal 7 is connected to the outermost part of the positive electrode current collector 5a. The negative electrode terminal 6 and the positive electrode terminal 7 extend outward from opening portions of the bag-shaped container member 2. A thermoplastic resin layer is provided on the inner surface of the bag-shaped container member 2, and the opening of the bag-shaped container member 2 are closed by thermal fusion bonding of the thermoplastic resin layer.

Figure 4:
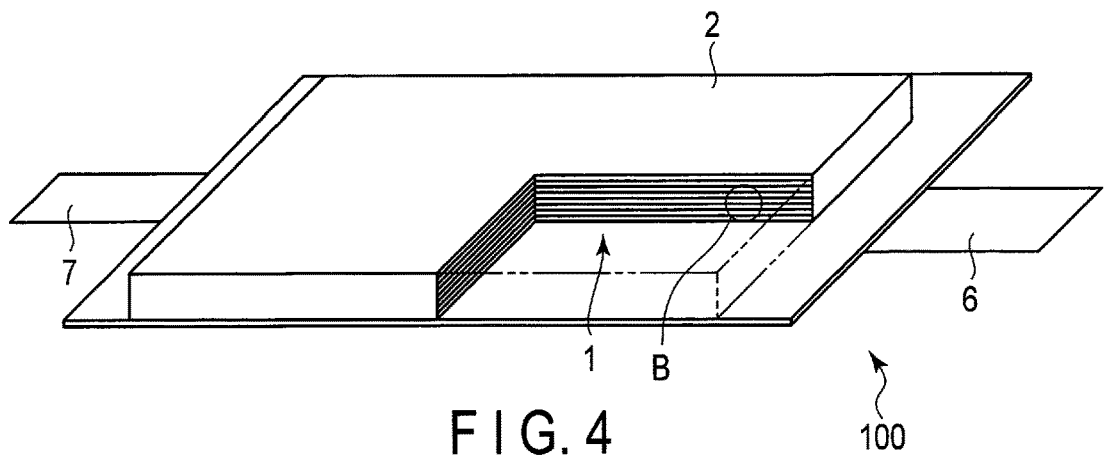
FIG. 4 is a partially cut-out perspective view schematically illustrating another example of a secondary battery according to the embodiment.
Figure 5:
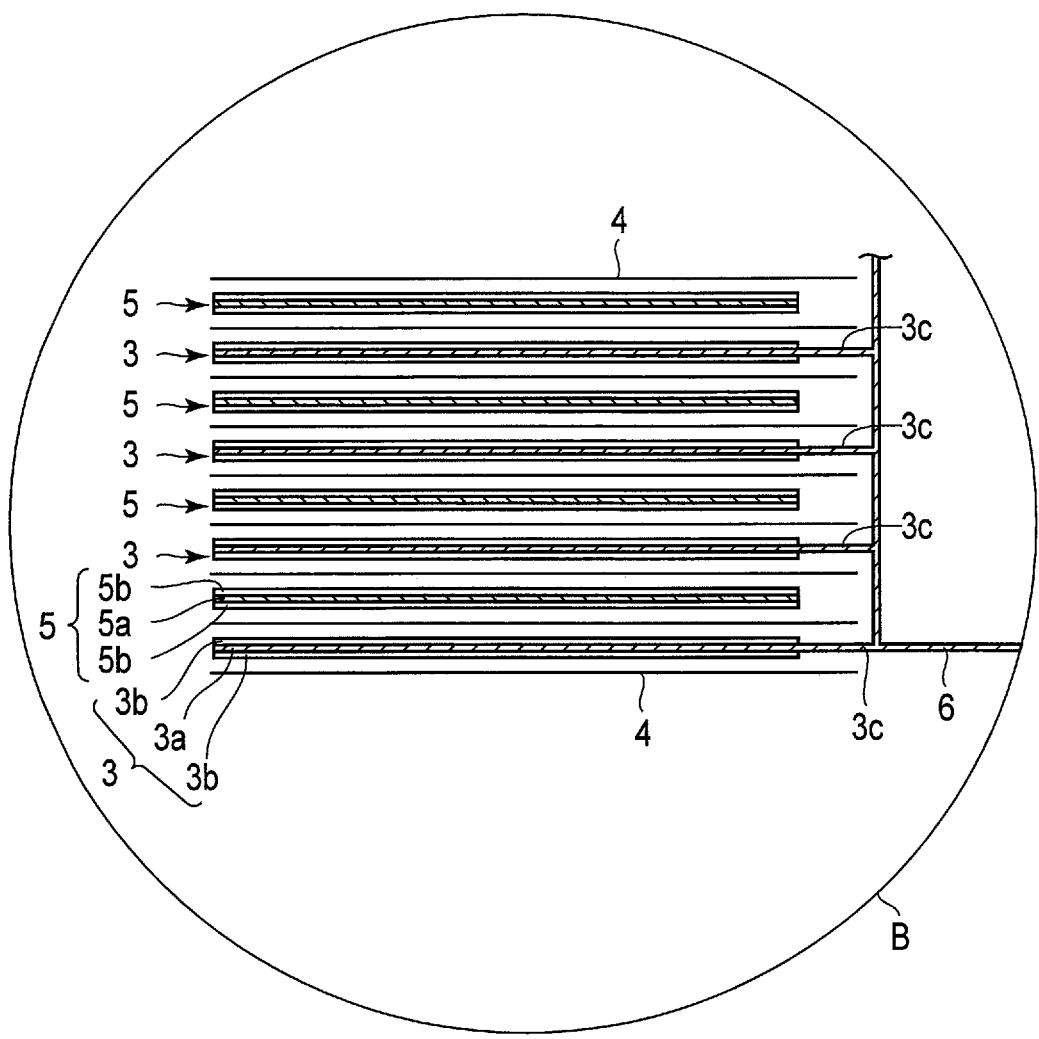
FIG. 5 is an enlarged cross-sectional view of section B of the secondary battery as illustrated in FIG. 4.

The secondary battery according to the embodiment is not limited to the secondary battery having the structure shown in FIGS. 2 and 3, and may be, for example, a battery having a structure shown in FIGS. 4 and 5.

FIG. 4 is a partial cut-away sectional perspective view schematically showing another example of the secondary battery according to the embodiment. FIG. 5 is an enlarged sectional view of a portion B of the secondary battery shown in FIG. 4.

The secondary battery 100 shown in FIGS. 4 and 5 includes an electrode group 1 shown in FIGS. 4 and 5, a container member 2 shown in FIG. 4, and an electrolyte (not shown). The electrode group 1 and the electrolyte are stored in the container member 2. The electrolyte is held in the electrode group 1.

The container member 2 is made of a laminate film including two resin layers and a metal layer intervening therebetween.

As shown in FIG. 5, the electrode group 1 is a laminated electrode group. The laminated electrode group 1 has a structure in which a negative electrode 3 and a positive electrode 5 are alternately laminated with a separator 4 intervening therebetween.

The electrode group 1 includes a plurality of the negative electrodes 3. The plurality of negative electrodes 3 are each provided with a negative electrode current collector 3a and a negative electrode active material-containing layer 3b carried on both sides of the negative electrode current collector 3a. Further, the electrode group 1 includes a plurality of the positive electrodes 5. The plurality of positive electrodes 5 are each provided with a positive electrode current collector 5a and a positive electrode active material-containing layer 5b carried on both sides of the positive electrode current collector 5a.

The negative electrode current collector 3a of each negative electrode 3 includes a portion 3c on one side where the negative electrode active material-containing layer 3b is not carried on any surfaces. This portion 3c acts as a negative electrode tab. As shown in FIG. 5, the portion 3c acting as the negative electrode tab does not overlap the positive electrode 5. In addition, a plurality of negative electrode tabs (portion 3c) is electrically connected to a belt-shaped negative electrode terminal 6. A tip of the belt-shaped negative electrode terminal 6 is drawn outward from a container member 2.

In addition, although not shown, the positive electrode current collector 5a of each positive electrode 5 includes a portion on one side where the positive electrode active material-containing layer 5b is not carried on any surfaces. This portion acts as a positive electrode tab. Like the negative electrode tab (portion 3c), the positive electrode tab does not overlap the negative electrode 3. In addition, the positive electrode tab is positioned on the opposite side of the electrode group 1 with respect to the negative electrode tab (portion 3c). The positive electrode tab is electrically connected to a belt-shaped positive electrode terminal 7. A tip of the belt-shaped positive electrode terminal 7 is positioned on the opposite side to the negative electrode terminal 6 and is drawn outward from the container member 2.

The secondary battery according to the second embodiment includes the electrode according to the first embodiment. Therefore, the secondary battery according to the second embodiment can achieve high energy density and excellent cycle life characteristics.

Third Embodiment

According to the third embodiment, a battery module is provided. The battery module according to the third embodiment is equipped with a plurality of the secondary batteries according to the second embodiment.

In the battery module according to the embodiment, individual unit cells may be electrically connected in series or in parallel, or may be arranged in combination of series connection and parallel connection.

Next, an example of the battery module according to the embodiment will be described with reference to the drawings.

Figure 6:
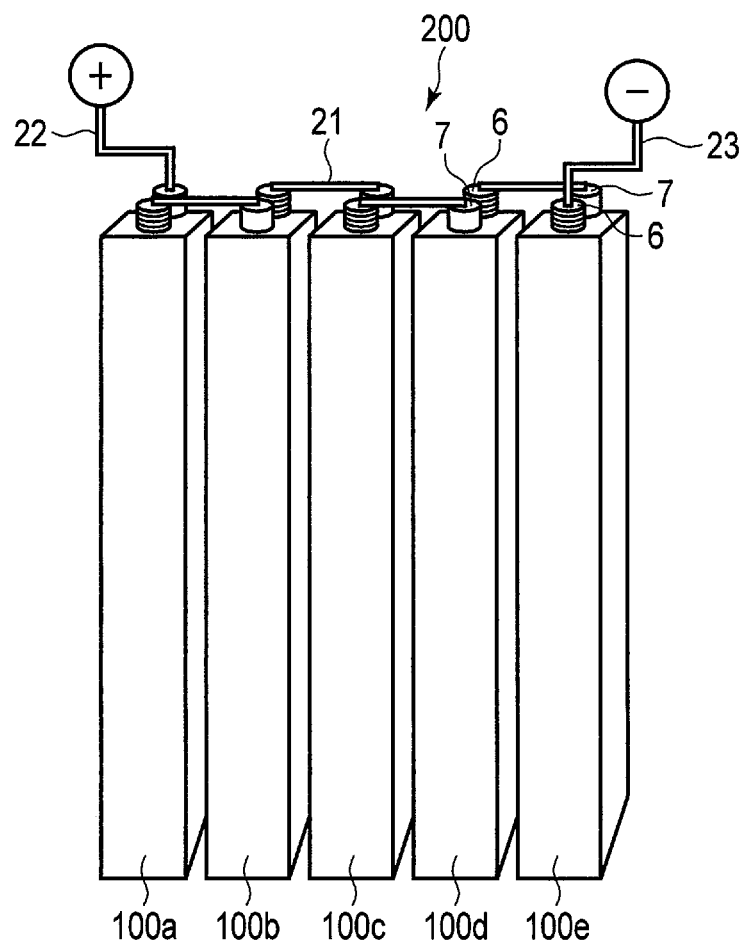
FIG. 6 is a perspective view schematically illustrating an example of a battery module according to the embodiment.

FIG. 6 is a perspective view schematically showing an example of the battery module according to the embodiment. The battery module 200 shown in FIG. 6 includes five unit cells 100a to 100e, four bus bars 21, a positive electrode-side lead 22, and a negative electrode-side lead 23. Each of the five unit cells 100a to 100e is the secondary battery according to the second embodiment.

The busbar 21 connects a negative electrode terminal 6 of a single unit cell 100a to a positive electrode terminal 7 of an adjacently positioned unit cell 100b. In this way, the five unit cells 100a to 100e are connected in series by the four bus bars 21. That is, the battery module 200 shown in FIG. 6 is a battery module of five in-series connection. Although an example is not illustrated, in a battery module containing a plurality of unit cells electrically connected in parallel, the plurality of unit cells may be electrically connected by connecting the plurality of negative electrode terminals to each other with busbars and also connecting the plurality of positive electrode terminals to each other with busbars, for example.

The positive electrode terminal 7 of at least one battery among the five unit cells 100a to 100e is electrically connected to a positive electrode lead 22 for external connection. Also, the negative electrode terminal 6 of at least one battery among the five unit cells 100a to 100e is electrically connected to a negative electrode lead 23 for external connection.

The battery module according to the third embodiment includes the secondary battery according to the second embodiment. Therefore, the battery module according to the third embodiment can achieve high energy density and excellent cycle life characteristics.

Fourth Embodiment

According to the fourth embodiment, a battery pack is provided. The battery pack includes the battery module according to the third embodiment. The battery pack may also be equipped with a single secondary battery according to the second embodiment instead of the battery module according to the third embodiment.

The battery pack according to the embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the embodiment may further include an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of a motive force of vehicles such as automobiles) is provided to the battery pack via the external power distribution terminal.

Next, an example of a battery pack according to the embodiment will be described with reference to the drawings.

Figure 7:
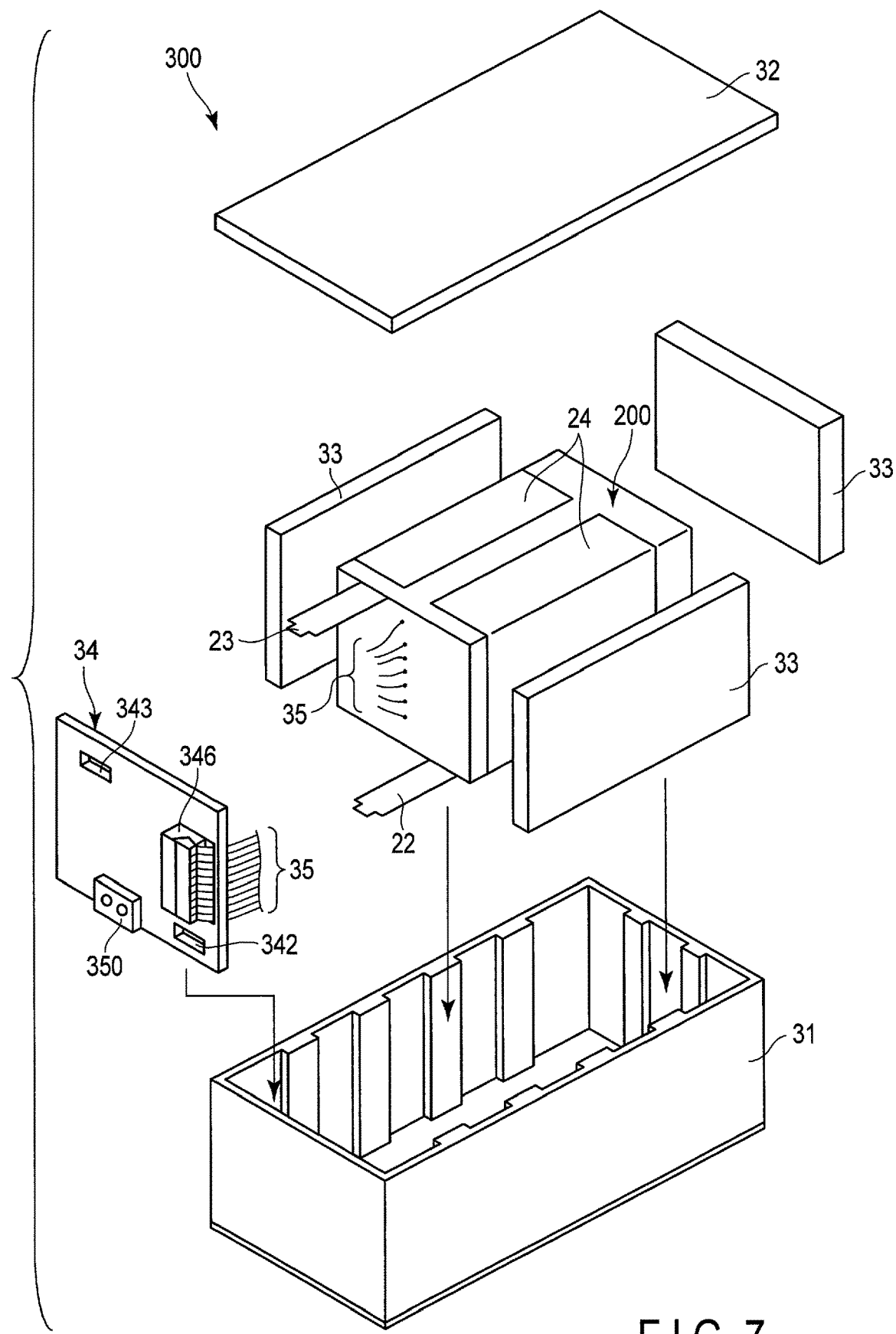
FIG. 7 is an exploded perspective view schematically illustrating an example of the battery pack according to the embodiment.
Figure 8:
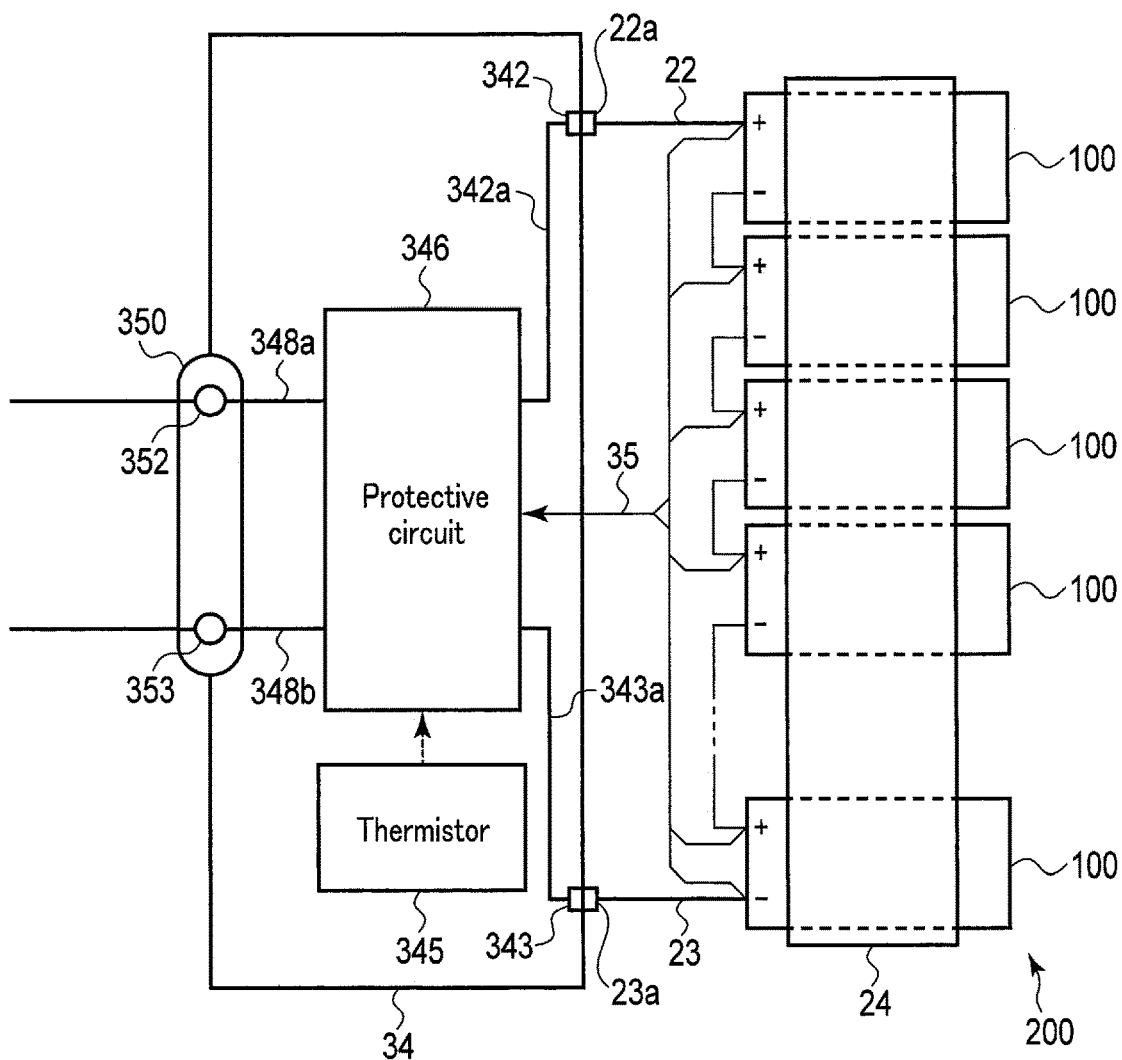
FIG. 8 is a block diagram illustrating an example of an electric circuit of the battery pack as illustrated in FIG. 7.

FIG. 7 is an exploded perspective view schematically showing an example of the battery pack according to the embodiment. FIG. 8 is a block diagram showing an example of an electric circuit of the battery pack shown in FIG. 7.

A battery pack 300 shown in FIGS. 7 and 8 includes a housing container 31, a lid 32, protective sheets 33, a battery module 200, a printed wiring board 34, wires 35, and an insulating plate (not shown).

A housing container 31 shown in FIG. 7 is a bottomed-square-shaped container having a rectangular bottom surface. The housing container 31 is configured to house protective sheet 33, a battery module 200, a printed wiring board 34, and wires 35. A lid 32 has a rectangular shape. The lid 32 covers the housing container 31 to house the battery module 200 and the like. Although not shown, opening(s) or connection terminal(s) for connecting to external device(s) and the like are provided on the housing container 31 and lid 32.

The battery module 200 includes plural unit cells 100, a positive electrode-side lead 22, a negative electrode-side lead 23, and an adhesive tape 24.

At least one in the plurality of unit cells 100 is a secondary battery according to the second embodiment. Each unit cell 100 in the plurality of unit cells 100 is electrically connected in series, as shown in FIG. 8. The plurality of unit cells 100 may alternatively be electrically connected in parallel, or connected in a combination of in-series connection and in-parallel connection. If the plurality of unit cells 100 is connected in parallel, the battery capacity increases as compared to a case where they are connected in series.

The adhesive tape 24 fastens the plural unit cells 100. The plural unit cells 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural unit cells 100.

One terminal of a positive electrode lead 22 is connected to a battery module 200. One terminal of the positive electrode lead 22 is electrically connected to the positive electrode of one or more unit cells 100. One terminal of a negative electrode lead 23 is connected to the battery module 200. One terminal of the negative electrode lead 23 is electrically connected to the negative electrode of one or more unit cells 100.

The printed wiring board 34 is arranged on the inner surface of the housing container 31 along the short side direction. The printed wiring board 34 includes a positive electrode connector 342, a negative electrode connector 343, a thermistor 345, a protective circuit 346, wirings 342a and 343a, an external power distribution terminal 350, a plus-side wire (positive-side wire) 348a, and a minus-side wire (negative-side wire) 348b. One principal surface of the printed wiring board 34 faces one side surface of the battery module 200. An insulating plate (not shown) is disposed in between the printed wiring board 34 and the battery module 200.

The other terminal 22a of the positive electrode lead 22 is electrically connected to a positive electrode connector 342. The other terminal 23a of the negative electrode lead 23 is electrically connected to a negative electrode connector 343.

The thermistor 345 is fixed to one principal surface of the printed wiring board 34. The thermistor 345 detects the temperature of each unit cell 100 and transmits detection signals to the protective circuit 346.

The external power distribution terminal 350 is fixed to the other principal surface of the printed wiring board 34. The external power distribution terminal 350 is electrically connected to device(s) that exists outside the battery pack 300. The external power distribution terminal 350 includes a positive side terminal 352 and a negative side terminal 353.

The protective circuit 346 is fixed to the other principal surface of the printed wiring board 34. The protective circuit 346 is connected to the positive side terminal 352 via the plus-side wire 348a. The protective circuit 346 is connected to the negative side terminal 353 via the minus-side wire 348b. In addition, the protective circuit 346 is electrically connected to the positive electrode connector 342 via the wiring 342a. The protective circuit 346 is electrically connected to the negative electrode connector 343 via the wiring 343a. Furthermore, the protective circuit 346 is electrically connected to each unit cell 100 in the plurality of unit cells 100 via the wires 35.

The protective sheets 33 are arranged on both inner surfaces of the housing container 31 along the long side direction and on one inner surface of the housing container 31 along the short side direction facing the printed wiring board 34 through the battery module 200. The protective sheet 33 is made of, for example, resin or rubber.

The protective circuit 346 controls charging and discharging of the plurality of unit cells 100. The protective circuit 346 is also configured to cut off electric connection between the protective circuit 346 and the external power distribution terminal 350 (the positive side terminal 352 and the negative side terminal 353) to the external devices, based on detection signals transmitted from the thermistor 345 or detection signals transmitted from each unit cell 100 or the battery module 200.

An example of the detection signal transmitted from the thermistor 345 is a signal indicating that the temperature of the unit cell(s) 100 is detected to be a predetermined temperature or more. An example of the detection signal transmitted from each unit cell 100 or the battery module 200 is a signal indicating detection of over-charge, over-discharge, and overcurrent of the unit cell(s) 100. When detecting over-charge or the like for each of the unit cells 100, the battery voltage may be detected, or a positive electrode potential or negative electrode potential may be detected. In the latter case, a lithium electrode to be used as a reference electrode may be inserted into each unit cell 100.

Note, that as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output current from the battery module 200 to an external device and input current from an external device to the battery module 200 via the external power distribution terminal 350. In other words, when using the battery pack 300 as a power source, the current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of a vehicle can be used as the charge current from the external device.

Note that the battery pack 300 may include a plurality of battery modules 200. In this case, the plurality of battery modules 200 may be connected in series, in parallel, or connected in a combination of in-series connection and in-parallel connection. The printed wiring board 34 and the wires 35 may be omitted. In this case, the positive electrode lead 22 and the negative electrode lead 23 may be used as the positive side terminal and the negative side terminal of the external power distribution terminal, respectively.

Such a battery pack is used for, for example, an application required to have the excellent cycle performance when a large current is taken out. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

The battery pack according to the fourth embodiment includes the secondary battery according to the second embodiment or the battery module according to the third embodiment. Therefore, according to the fourth embodiment, it is possible to provide the battery pack including the secondary battery or the battery module that can realize high energy density and excellent cycle life characteristics.

Fifth Embodiment

According to the fifth embodiment, a vehicle is provided. The vehicle includes the battery pack according to the fourth embodiment.

In a vehicle according to the fifth embodiment, the battery pack is configured, for example, to recover regenerative energy from motive force of the vehicle. The vehicle may include a mechanism configured to convert kinetic energy of the vehicle into regenerative energy.

Examples of the vehicle according to the fifth embodiment include two- to four-wheeled hybrid electric automobiles, two- to four-wheeled electric automobiles, electric assist bicycles, and railway cars.

In the vehicle according to the fifth embodiment, the installing position of the battery pack is not particularly limited. For example, the battery pack may be installed in the engine compartment of the vehicle, in rear parts of the vehicle, or under seats.

A plurality of battery packs is loaded on the vehicle according to the fifth embodiment. In this case, the batteries included in each of the battery packs may be electrically connected to each other in series, in parallel, or in a combination of in-series connection and in-parallel connection. For example, in the case where each battery pack includes a battery module, the battery modules may be electrically connected to each other in series, in parallel, or in a combination of in-series connection and in-parallel connection. Alternatively, in the case where each battery pack includes a single battery, each of the batteries may be electrically connected to each other in series, in parallel, or in a combination of in-series connection and in-parallel connection.

Next, one example of the vehicle according to the fifth embodiment will be described with reference to the drawings.

Figure 9:
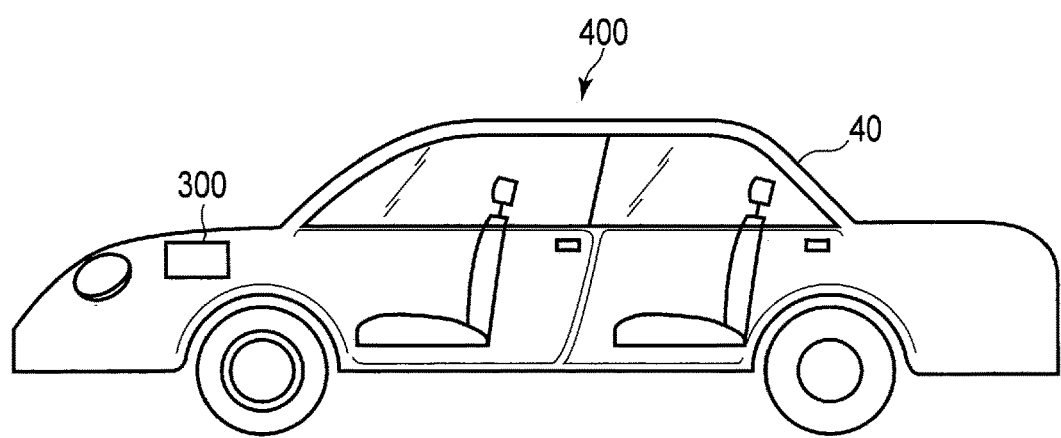
FIG. 9 is a partial perspective view schematically illustrating an example of a vehicle according to the embodiment.

FIG. 9 is a partially transparent diagram schematically illustrating one example of a vehicle according to the embodiment.

A vehicle 400 illustrated in FIG. 9 includes a vehicle body 40 and a battery pack 300 according to the embodiment. In the example illustrated in FIG. 9, the vehicle 400 is a four-wheeled automobile.

A plurality of the battery packs 300 may be loaded on the vehicle 400. In this case, the batteries included in the battery packs 300 (for example, unit cell or battery modules) may be connected in series, connected in parallel, or connected in a combination of in-series connection and in-parallel connection.

In FIG. 9, the battery pack 300 is installed in an engine compartment located at the front of the vehicle body 40. As described above, the battery pack 300 may be installed in rear sections of the vehicle body 40, or under a seat. The battery pack 300 may be used as a power source of the vehicle 400. In addition, the battery pack 300 can recover regenerative energy of a motive force of the vehicle 400.

Next, an embodiment of the vehicle according to the fifth embodiment will be described with reference to FIG. 10.

Figure 10:
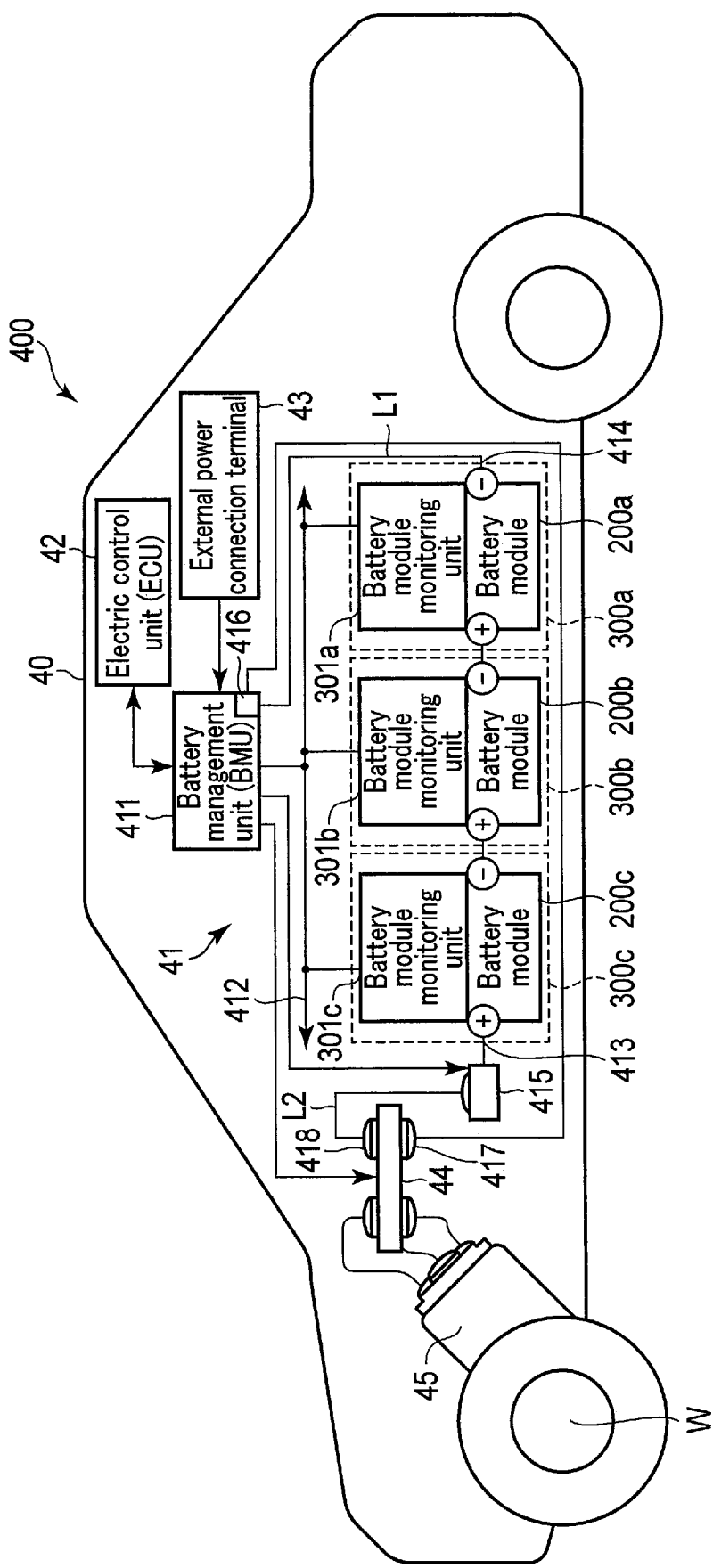
FIG. 10 is a diagram schematically illustrating an example of a control system related to an electric system in the vehicle according to the embodiment.

FIG. 10 is a diagram schematically illustrating one example of a control system related to an electrical system in the vehicle according to the fifth embodiment. The vehicle 400 illustrated in FIG. 10 is an electric automobile.

The vehicle 400, shown in FIG. 10, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 10, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

A battery pack 300a is provided with a battery module 200a and a battery module monitoring apparatus 301a (for example, voltage temperature monitoring (VTM)). A battery pack 300b is provided with a battery module 200b and a battery module monitoring apparatus 301b. A battery pack 300c is provided with a battery module 200c and a battery module monitoring apparatus 301c. The battery packs 300a to 300c are battery packs similar to the battery pack 300 described earlier, and the battery modules 200a to 200c are battery modules similar to the battery module 200 described earlier. The battery modules 200a to 200c are electrically connected in series. The battery packs 300a, 300b, and 300c are removable independently of each other, and each can be replaced with a different battery pack 300.

Each of the battery modules 200a to 200c includes plural battery cells connected in series. At least one of the plural battery cells is the secondary battery according to the second embodiment. The battery modules 200a to 200c each perform charging and discharging via a positive electrode terminal 413 and a negative electrode terminal 414.

A battery management apparatus 411 communicates with the battery module monitoring apparatus 301a to 301c, and collects information related to the voltage, temperature, and the like for each of the unit cells 100 included in the battery modules 200a to 200c included in the vehicle power source 41. With this arrangement, the battery management apparatus 411 collects information related to the maintenance of the vehicle power source 41.

The battery management apparatus 411 and the battery module monitoring apparatus 301a to 301c are connected via a communication bus 412. In the communication bus 412, a set of communication wires are shared with a plurality of nodes (the battery management apparatus 411 and one or more of the battery module monitoring apparatus 301a to 301c). The communication bus 412 is a communication bus, for example, configured in accordance with the controller area network (CAN) standard.

The battery module monitoring units 301a to 301c measure a voltage and a temperature of each battery cell in the battery modules 200a to 200c based on commands from the battery management unit 411. It is possible, however, to measure the temperatures only at several points per battery module, and the temperatures of all of the battery cells need not be measured.

The vehicle power source 41 can also have an electromagnetic contactor (for example, a switch apparatus 415 illustrated in FIG. 10) that switches the presence or absence of an electrical connection between a positive electrode terminal 413 and a negative electrode terminal 414. The switch apparatus 415 includes a pre-charge switch (not illustrated) that turns on when the battery modules 200a to 200c are charged, and a main switch (not illustrated) that turns on when the output from the battery modules 200a to 200c is supplied to the load. Each of the pre-charge switch and the main switch is provided with a relay circuit (not illustrated) that switches on or off according to a signal supplied to a coil disposed near a switching element. The electromagnetic contactor such as the switch apparatus 415 is controlled according to of control signals from the battery management apparatus 411 or the vehicle ECU 42 that controls the entire operation of the vehicle 400.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 is controlled based on control signals from the battery management apparatus 411, or the vehicle ECU 42 which controls the entire operation of the vehicle. By controlling the inverter 44, the output voltage from the inverter 44 is adjusted.

The drive motor 45 is rotated by electric power supplied from the inverter 44. The driving force produced by the rotation of the drive motor 45 is transmitted to an axle (or axles) and drive wheels W via a differential gear unit for example.

The vehicle 400 also includes a regenerative brake mechanism (regenerator), though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The converted direct current is inputted into the vehicle power source 41.

One terminal of a connection line L1 is connected to the negative electrode terminal 414 of the vehicle power source 41. The other terminal of the connection line L1 is connected to a negative electrode input terminal 417 of the inverter 44. On the connection line L1, a current detector (current detection circuit) 416 is provided inside the battery management apparatus 411 between the negative electrode terminal 414 and the negative electrode input terminal 417.

One terminal of a connection line L2 is connected to the positive electrode terminal 413 of the vehicle power source 41. The other terminal of the connection line L2 is connected to a positive electrode input terminal 418 of the inverter 44. On the connection line L2, the switch apparatus 415 is provided between the positive electrode terminal 413 and the positive electrode input terminal 418.

The external terminal 43 is connected to the battery management apparatus 411. The external terminal 43 can be connected to, for example, an external power source.

The vehicle ECU 42 cooperatively controls the vehicle power source 41, the switch apparatus 415, the inverter 44, and the like together with other management apparatus and control apparatus, including the battery management apparatus 411, in response to operation input from a driver or the like. By the cooperative control by the vehicle ECU 42 and the like, the output of electric power from the vehicle power source 41, the charging of the vehicle power source 41, and the like are controlled, and the vehicle 400 is managed as a whole. Data related to the maintenance of the vehicle power source 41, such as the remaining capacity of the vehicle power source 41, is transferred between the battery management apparatus 411 and the vehicle ECU 42 by a communication line.

The vehicle according to the fifth embodiment includes the battery pack according to the fourth embodiment. Therefore, according to the fifth embodiment, it is possible to provide the vehicle including the battery pack that can realize high energy density and excellent cycle life characteristics.

EXAMPLES

Although Examples will be described hereinafter, the embodiments are not limited to Examples to be described hereinafter.

Example 1

In Example 1, $Nb_2TiO_7$ powder having a small particle size subjected to the carbon coating treatment and $Nb_2TiO_7$ powder having a large particle size not subjected to the carbon coating treatment were respectively synthesized and then mixed.

<Preparation of Starting Materials>

First, commercially available $TiO_2$ powder and $Nb_2O_5$ powder were prepared as starting materials. Ethanol was added to the $TiO_2$ powder and filtered using a membrane filter having a pore size of 0.45 μm such that the $TiO_2$ powder was separated into a large particle group having a particle size of 0.45 μm or more and a small particle group having a particle size of smaller than 0.45 μm. Similarly, the $Nb_2O_5$ powder was separated into a large particle group and a small particle group using a membrane filter having a pore size of 0.45 μm.

<Synthesis of $Nb_2TiO_7$ Powder with Large Particle Size>

A large particle group of $TiO_2$ having a particle size of 0.45 μm or more and a large particle group of $Nb_2O_5$ having a particle size of 0.45 μm or more were respectively dried and put in a mortar at a raw material molar ratio of 1:1. Ethanol was added to the mortar and subjected to wet mixing.

The obtained mixture was put into an electric furnace and subjected to a heat treatment. First, preliminary firing was performed at a temperature of 850° C. for 6 hours. Next, the preliminary-fired powder was taken out of the furnace, re-ground, and further mixed in a dry manner to make the particles uniform.

The resulting mixture was then subjected to first main firing for 6 hours at a temperature of 1100° C. After firing, the fired powder was taken out from the furnace, and the fired powder was remixed in a dry manner to make the particles uniform.

Subsequently, the remixed fired powder was put into the furnace and subjected to second main firing for 6 hours at a temperature of 1100° C. After firing, the fired powder was taken out from the furnace, and the fired powder was remixed in a dry manner to make the particles uniform.

Subsequently, the remixed fired powder was put into the furnace and subjected to third main firing for 12 hours at a temperature of 1100° C. At this time, the powder that had been fired at 1100° C. was quickly taken out from the electric furnace and allowed to cool in air at room temperature to obtain $Nb_2TiO_7$ powder having a large particle size (hereinafter, also referred to as second active material particles).

<Synthesis of $Nb_2TiO_7$ Powder with Small Particle Size and Carbon Material Layer>

A small particle group of $TiO_2$ having a particle size of smaller than 0.45 μm and a small particle group of $Nb_2O_5$ having a particle size of smaller than 0.45 μm were respectively dried and put in a mortar at a raw material molar ratio of 1:1. Ethanol was added to the mortar and subjected to wet mixing.

The obtained mixture was put into an electric furnace and subjected to a heat treatment. First, preliminary firing was performed at a temperature of 850° C. for 6 hours. Next, the preliminary-fired powder was taken out of the furnace, re-ground, and further mixed in a dry manner to make the particles uniform.

The resulting mixture was then subjected to first main firing for 6 hours at a temperature of 1100° C. After firing, the fired powder was taken out from the furnace, and the fired powder was remixed in a dry manner to make the particles uniform.

Subsequently, the remixed fired powder was put into the furnace and subjected to second main firing for 6 hours at a temperature of 1100° C. After firing, the fired powder was taken out from the furnace, and the fired powder was remixed in a dry manner to make the particles uniform.

Subsequently, the remixed fired powder was put into the furnace and subjected to third main firing for 12 hours at a temperature of 1100° C. At this time, the powder that had been fired at 1100° C. was quickly taken out from the electric furnace and allowed to cool in air at room temperature to obtain $Nb_2TiO_7$ powder having a small particle size.

The obtained $Nb_2TiO_7$ powder was subjected to the carbon coating treatment as follows.

Using the obtained $Nb_2TiO_7$ powder as a precursor, 10% by weight of sucrose with respect to the precursor was added to this precursor, and ethanol was further added. The mixture containing the precursor was uniformly mixed with a ball mill for 15 minutes. Thereafter, the mixture was heat-treated at 700° C. for 1 hour in an argon atmosphere. In this way, $Nb_2TiO_7$ powder (hereinafter, also referred to as first active material particles) having a small particle size coated with the carbon material layer was obtained.

<Production of Active Material Particles>

The first active material particles and the second active material particles produced previously were mixed at a mass ratio of 0.13:99.87 to obtain active material particles.

<Production of Electrode>

An electrode was produced as follows.

First, 90 parts by mass of an active material (active material particles produced previously), 5 parts by mass of a conductive agent, and 5 parts by mass of a binder were dispersed in pure water as a solvent to prepare a slurry. As the active material, active material particles obtained by the method described above were used. As the conductive agent, a mixture of acetylene black and graphite was used. In this mixture, a mass ratio of acetylene black to graphite was 1:2. As the binder, a mixture of carboxymethyl cellulose (CMC) and styrene butadiene rubber (SBR) was used as the binder. In this mixture, the mass ratio of CMC to SBR was 1:1.

Subsequently, the obtained slurry was applied to one surface of a current collector, and the active material-containing layer was formed by drying a coating film. As the current collector, an aluminum foil having a thickness of 12 μm was used. Next, the current collector and the active material-containing layer were pressed at a predetermined pressing pressure to obtain an electrode having an electrode density of 2.7 g/cm³. The basis weight of the obtained electrode was 60 g/m². The electrode density is the density of the active material-containing layer excluding the current collector. In Examples 2 to 35 and Comparative Examples 1 to 3, as described later, the electrode was pressed at the same press pressure (common press pressure) as in Example 1.

<Preparation of Nonaqueous Electrolyte>

Ethylene carbonate and diethyl carbonate were mixed at a volume ratio of 1:2 to prepare a mixed solvent. In this mixed solvent, lithium hexafluorophosphate was dissolved at a concentration of 1 M (mol/L) to prepare a nonaqueous electrolyte.

<Production of Electrochemical Measurement Cell>

An electrochemical measurement cell according to Example 1 was produced using the electrode produced above, a lithium metal foil as a counter electrode, and the prepared nonaqueous electrolyte.

Examples 2 to 30

Except for the following conditions, an electrode was produced in the same manner as in Example 1, and an electrochemical measurement cell was produced using this electrode.

For each example, as indicated in Tables 1 and 2, the pore size of the membrane filter when the starting material is prepared and the mixing ratio (mass ratio) of the first active material particles and the second active material particles were changed. Further, in producing the core particles included in the first active material particles and the second active material particles, grinding conditions and firing conditions were changed so that a median diameter d50, a mode diameter of the first region, and a mode diameter of the second region were set as indicated in Tables 1 and 2.

Examples 31 to 33

An electrode was produced in the same manner as in Example 1 except that the compositions indicated in Table 1 were synthesized as an active material composition of the monoclinic niobium-titanium composite oxide, and then an electrochemical measurement cell was produced using this electrode.

Example 34

An electrode was produced in the same manner as in Example 1 except that 5% by mass of $Li_4Ti_5O_{12}$ particles were further mixed to the total mass of the first active material particles and the second active material particles synthesized as the active material particles, and then an electrochemical measurement cell was produced using this electrode. The $Li_4Ti_5O_{12}$ particles did not have carbon material layers on the particle surfaces.

Example 35

An electrode was produced in the same manner as in Example 1 except that 5% by mass of $Li_2Na_{1.8}Ti_{5.8}Nb_{0.2}O_{14}$ particles were further mixed to the total mass of the first active material particles and the second active material particles synthesized as the active material particles, and then an electrochemical measurement cell was produced using this electrode. The $Li_2Na_{1.8}Ti_{5.8}Nb_{0.2}O_{14}$ particles did not have a carbon material layer on the particle surface.

Comparative Example 1

An electrode was produced in the same manner as in Example 1 except that the carbon coating treatment was performed to the second active material particles in the same manner as that performed in the synthesis of the first active material particles in synthesizing the second active material particles, and then an electrochemical measurement cell was produced using this electrode.

Comparative Example 2

An electrode was produced in the same manner as in Example 1 except that the carbon coating treatment was performed to the second active material particles in the same manner as that performed in the synthesis of the first active material particles in synthesizing the second active material particles, and the carbon coating treatment for the first active material particles was omitted, and then an electrochemical measurement cell was produced using this electrode.

Comparative Example 3

An electrode was produced in the same manner as in Example 1 except that, in synthesizing the first active material particles and the second active material particles, neither the first active material particles and the second active material particles were subjected to the carbon coating treatment. Then an electrochemical measurement cell was produced using this electrode.

<Particle Size Distribution Measurement, Carbon Coverage Measurement>

For each electrode produced as examples and comparative examples, the particle size distribution was measured by the method described in the first embodiment.

From the obtained particle size distribution chart, the median diameter d50 of the active material particles included in the electrode was determined. Further, the mode diameter in the first region and the mode diameter in the second region in the particle size distribution chart were respectively determined. Furthermore, the carbon coverage was measured by the method described in the first embodiment.

<Electrochemical Measurement>

A charge and discharge test was conducted at room temperature using each of the produced electrochemical measurement cells. The charge and discharge was performed at a charge and discharge current value of 0.2 C (time discharge rate) in a potential range from 1.0 V to 3.0 V (vs. Li/Li$^+$) based on the oxidation-reduction potential of lithium.

The charge capacity and discharge capacity in initial charge and discharge were measured. The coulomb efficiency was calculated by dividing the discharge capacity in the initial charge and discharge by the charge capacity and multiplying by 100 (coulomb efficiency=initial discharge capacity/initial charge capacity×100).

Next, the charge and discharge was repeated 100 cycles. One cycle was obtained by charging once and discharging once. Here, the charge and discharge was performed at room temperature at a charge and discharge current value of 1 C (time discharge rate) in a potential range from 1.0 V to 3.0 V (vs. Li/Li$^+$) based on the oxidation-reduction potential of lithium.

After performing the charge and discharge at the 100th cycle, charge and discharge was performed again at 0.2 C (time discharge rate) to measure the discharge capacity. The capacity retention ratio after 100 cycles was calculated by dividing the discharge capacity after 100 cycles by the initial discharge capacity (capacity retention ratio after 100 cycles=discharge capacity after 100 cycles/initial discharge capacity×100[%]). The capacity retention ratio is an index for evaluating cycle life characteristics.

Moreover, the capacity density was calculated by multiplying the electrode density and the initial discharge capacity. The capacity density is an index for evaluating the energy density.

The above results are summarized in Tables 1 to 4 below. In Tables 1 and 2, "carbon coverage" in the column of "first region" indicates the carbon coverage of the first particle group included in the first region in the particle size distribution chart. The "carbon coverage" in the column of "second region" indicates the carbon coverage of the second particle group included in the second region in the particle size distribution chart. The "mixing ratio" indicates the mixing ratio of the first active material particles and the second active material particles (first active material particles:second active material particles) in mass ratio. Tables 3 and 4 also indicate that the initial discharge capacity [mAh/g], coulomb efficiency (%), capacity density [mAh/cm$^3$], and discharge capacity retention ratio (%) after 100 cycles obtained by tests on each electrochemical measurement cell.

TABLE 1

| | Active material composition | Electrode density [g/cm$^3$] | Membrane filter pore size [μm] | Mixing ratio (first active material particles:second active material particles) | Median diameter (d50) [μm] | First region Carbon coverage [%] | First region Mode diameter [μm] | Second region Carbon coverage [%] | Second region Mode diameter [μm] |
|---|---|---|---|---|---|---|---|---|---|
| Example 1 | Nb$_2$TiO$_7$ | 2.7 | 0.45 | 0.13:99.87 | 1.4 | 95 | 0.5 | 5 | 3.0 |
| Example 2 | Nb$_2$TiO$_7$ | 2.85 | 0.25 | 0.1:99.9 | 1.4 | 94 | 0.3 | 10 | 3.0 |
| Example 3 | Nb$_2$TiO$_7$ | 2.7 | 0.35 | 0.11:99.89 | 2.0 | 95 | 0.4 | 3 | 10.0 |
| Example 4 | Nb$_2$TiO$_7$ | 2.5 | 0.80 | 0.15:99.85 | 5.0 | 96 | 1.0 | 5 | 20.0 |
| Example 5 | Nb$_2$TiO$_7$ | 2.5 | 0.20 | 0.08:99.92 | 1.0 | 95 | 0.1 | 7 | 3.0 |
| Example 6 | Nb$_2$TiO$_7$ | 2.6 | 0.20 | 0.1:99.9 | 1.2 | 95 | 0.2 | 5 | 3.0 |
| Example 7 | Nb$_2$TiO$_7$ | 2.7 | 0.45 | 0.1:99.9 | 1.4 | 96 | 0.5 | 3 | 3.0 |
| Example 8 | Nb$_2$TiO$_7$ | 2.7 | 1.00 | 0.15:99.85 | 1.4 | 94 | 1.0 | 8 | 3.5 |
| Example 9 | Nb$_2$TiO$_7$ | 2.8 | 1.00 | 2.0:98.0 | 1.6 | 95 | 2.0 | 5 | 4.0 |
| Example 10 | Nb$_2$TiO$_7$ | 2.7 | 0.45 | 0.15:99.85 | 1.3 | 96 | 0.5 | 4 | 2.7 |
| Example 11 | Nb$_2$TiO$_7$ | 2.7 | 0.45 | 0.09:99.91 | 2.0 | 95 | 0.5 | 5 | 5.0 |
| Example 12 | Nb$_2$TiO$_7$ | 2.6 | 0.45 | 0.05:99.5 | 3.0 | 94 | 0.5 | 4 | 10.0 |
| Example 13 | Nb$_2$TiO$_7$ | 2.6 | 0.45 | 0.05:99.5 | 5.0 | 95 | 0.5 | 7 | 20.0 |
| Example 14 | Nb$_2$TiO$_7$ | 2.8 | 0.45 | 0.13:99.87 | 1.4 | 95 | 0.5 | 0 | 3.0 |
| Example 15 | Nb$_2$TiO$_7$ | 2.7 | 0.45 | 0.13:99.87 | 1.4 | 95 | 0.5 | 10 | 3.0 |
| Example 16 | Nb$_2$TiO$_7$ | 2.7 | 0.45 | 0.13:99.87 | 1.4 | 95 | 0.5 | 20 | 3.0 |
| Example 17 | Nb$_2$TiO$_7$ | 2.6 | 0.45 | 0.13:99.87 | 1.4 | 95 | 0.5 | 30 | 3.0 |
| Example 18 | Nb$_2$TiO$_7$ | 2.8 | 0.45 | 0.13:99.87 | 1.4 | 30 | 0.5 | 5 | 3.5 |
| Example 19 | Nb$_2$TiO- | 2.8 | 0.45 | 0.13:99.87 | 1.4 | 40 | 0.5 | 5 | 3.5 |
| Example 20 | Nb$_2$TiO$_7$ | 2.8 | 0.45 | 0.13:99.87 | 1.4 | 50 | 0.5 | 5 | 3.5 |
| Example 21 | Nb$_2$TiO$_7$ | 2.8 | 0.45 | 0.13:99.87 | 1.4 | 60 | 0.5 | 5 | 3.5 |

TABLE 1-continued

| | Active material composition | Electrode density [g/cm³] | Membrane filter pore size [μm] | Mixing ratio (first active material particles:second active material particles) | Median diameter (d50) [μm] | First region Carbon coverage [%] | First region Mode diameter [μm] | Second region Carbon coverage [%] | Second region Mode diameter [μm] |
|---|---|---|---|---|---|---|---|---|---|
| Example 22 | Nb₂TiO₇ | 2.7 | 0.45 | 0.13:99.87 | 1.4 | 70 | 0.5 | 5 | 3.5 |
| Example 23 | Nb₂TiO- | 2.7 | 0.45 | 0.13:99.87 | 1.4 | 80 | 0.5 | 5 | 3.5 |
| Example 24 | Nb₂TiO₇ | 2.7 | 0.45 | 0.13:99.87 | 1.4 | 90 | 0.5 | 5 | 3.5 |
| Example 25 | Nb₂TiO₇ | 2.7 | 0.45 | 0.13:99.87 | 1.4 | 95 | 0.5 | 5 | 3.5 |

TABLE 2

| | Active material composition | Electrode density [g/cm³] | Membrane filter pore size [μm] | Mixing ratio (first active material particles:second active material particles) | Median diameter (d50) [μm] | First region Carbon coverage [%] | First region Mode diameter [μm] | Second region Carbon coverage [%] | Second region Mode diameter [μm] |
|---|---|---|---|---|---|---|---|---|---|
| Example 26 | Nb₂TiO₇ | 2.5 | 0.45 | 0.06:99.94 | 2.0 | 95 | 0.5 | 5 | 3.0 |
| Example 27 | Nb₂TiO₇ | 2.6 | 0.45 | 0.10:99.90 | 1.8 | 95 | 0.5 | 5 | 3.0 |
| Example 28 | Nb₂TiO₇ | 2.7 | 0.45 | 0.13:99.87 | 1.4 | 95 | 0.5 | 5 | 3.0 |
| Example 29 | Nb₂TiO₇ | 2.8 | 0.45 | 0.50:99.50 | 1.2 | 95 | 0.5 | 5 | 3.0 |
| Example 30 | Nb₂TiO₇ | 2.9 | 0.45 | 1.0:99.0 | 1.0 | 95 | 0.5 | 5 | 3.0 |
| Example 31 | Nb₂₄TiO₆₂ | 2.7 | 0.45 | 0.13:99.87 | 1.4 | 95 | 0.5 | 5 | 3.0 |
| Example 32 | Nb₁₄TiO₃₇ | 2.7 | 0.45 | 0.13:99.87 | 1.4 | 95 | 0.5 | 5 | 3.0 |
| Example 33 | Nb₁₀Ti₂O₂₉ | 2.7 | 0.45 | 0.13:99.87 | 1.4 | 95 | 0.5 | 5 | 3.0 |
| Example 34 | Nb₂TiO₇, Li₄Ti₅O₁₂ | 2.8 | 0.45 | 0.13:99.87 | 1.3 | 95 | 0.5 | 5 | 2.5 |
| Example 35 | Nb₂TiO₇, Li₂Na₁.₈Ti₅.₈Nb₀.₂O₁₄ | 2.8 | 0.45 | 0.13:99.87 | 1.3 | 95 | 0.5 | 5 | 2.8 |
| Comparative Example 1 | Nb₂TiO₇ | 2.4 | 0.45 | 0.13:99.87 | 1.4 | 95 | 0.5 | 95 | 3.0 |
| Comparative Example 2 | Nb₂TiO₇ | 2.4 | 0.45 | 0.13:99.87 | 1.4 | 5 | 0.5 | 95 | 3.0 |
| Comparative Example 3 | Nb₂TiO₇ | 2.8 | 0.45 | 0.13:99.87 | 1.4 | 0 | 0.5 | 0 | 3.0 |

TABLE 3

| | Electrochemical properties | | | |
|---|---|---|---|---|
| | Initial discharge capacity [mAh/g] | Coulomb efficiency [%] | Capacity density [mAh/cm³] | Retention ratio after 100 cycles [%] |
| Example 1 | 280.3 | 94.0 | 756.8 | 95.0 |
| Example 2 | 281.6 | 93.0 | 802.6 | 94.5 |
| Example 3 | 281.2 | 94.3 | 759.2 | 94.0 |
| Example 4 | 281.3 | 94.0 | 703.3 | 94.3 |
| Example 5 | 286.3 | 94.1 | 715.8 | 94.3 |
| Example 6 | 281.0 | 93.9 | 730.6 | 94.7 |
| Example 7 | 283.0 | 94.2 | 764.1 | 95.3 |
| Example 8 | 274.5 | 93.6 | 741.2 | 95.0 |
| Example 9 | 279.0 | 94.0 | 781.2 | 95.1 |
| Example 10 | 283.0 | 94.7 | 764.1 | 94.3 |
| Example 11 | 284.0 | 94.0 | 766.8 | 94.2 |
| Example 12 | 285.0 | 94.0 | 741.0 | 95.1 |
| Example 13 | 282.0 | 93.0 | 733.2 | 94.3 |
| Example 14 | 284.0 | 94.0 | 795.2 | 94.3 |
| Example 15 | 285.0 | 93.8 | 769.5 | 94.6 |
| Example 16 | 283.0 | 94.0 | 764.1 | 94.9 |
| Example 17 | 279.0 | 93.6 | 725.4 | 95.3 |
| Example 18 | 280.0 | 93.7 | 784.0 | 94.4 |
| Example 19 | 283.2 | 93.8 | 793.0 | 94.5 |
| Example 20 | 281.3 | 93.8 | 787.6 | 94.6 |
| Example 21 | 283.2 | 94.0 | 793.0 | 94.5 |
| Example 22 | 283.4 | 94.5 | 765.2 | 94.8 |
| Example 23 | 283.5 | 94.3 | 765.5 | 95.3 |
| Example 24 | 283.6 | 94.4 | 765.7 | 95.3 |
| Example 25 | 283.3 | 94.5 | 764.9 | 95.0 |

TABLE 4

| | Electrochemical properties | | | |
|---|---|---|---|---|
| | Initial discharge capacity [mAh/g] | Coulomb efficiency [%] | Capacity density [mAh/cm³] | Retention ratio after 100 cycles [%] |
| Example 26 | 280.4 | 94.0 | 701.0 | 94.4 |
| Example 27 | 281.0 | 93.6 | 730.6 | 94.3 |
| Example 28 | 280.5 | 94.1 | 757.4 | 95.3 |
| Example 29 | 280.1 | 93.8 | 784.3 | 94.4 |
| Example 30 | 280.0 | 93.6 | 812.0 | 94.3 |
| Example 31 | 274.1 | 93.6 | 740.1 | 94.3 |
| Example 32 | 281.3 | 93.6 | 759.5 | 94.8 |

TABLE 4-continued

| | Electrochemical properties | | | |
|---|---|---|---|---|
| | Initial discharge capacity [mAh/g] | Coulomb efficiency [%] | Capacity density [mAh/cm$^3$] | Retention ratio after 100 cycles [%] |
| Example 33 | 281.2 | 93.8 | 759.2 | 95.0 |
| Example 34 | 279.3 | 94.5 | 782.0 | 94.5 |
| Example 35 | 276.8 | 93.0 | 775.0 | 94.3 |
| Comparative Example 1 | 276.0 | 93.2 | 662.4 | 94.5 |
| Comparative Example 2 | 280.3 | 93.6 | 672.7 | 93.4 |
| Comparative Example 3 | 281.3 | 93.5 | 787.6 | 92.0 |

From Table 1 to Table 4, the following can be understood.

In all Examples 1 to 35 in which the carbon coverage of the first particle group was higher than the carbon coverage of the second particle group, high energy density and excellent cycle life characteristics were achieved in a well-balanced manner.

In contrast, in Comparative Example 1 in which the carbon coverage of the first particle group and the carbon coverage of the second particle group were the same as each other, the capacity retention ratio was equivalent to that of the examples, but the capacity density was deteriorated as compared to the examples. It is considered that the electrode density is less likely to be increased by a predetermined pressing pressure, since the volume of the carbon material layer per unit volume is large, the volume of the active material particles is small, and there are coarse particles of the carbon material layer that are generated by peeling off the carbon material layer.

In Comparative Example 2 in which the carbon coverage of the second particle group was larger than the carbon coverage of the first particle group, the capacity density and the capacity retention ratio were deteriorated as compared to the examples. Since the carbon coverage of the first particle group having a large specific surface area is lower than that of the second particle group, it is considered that the first particle group was rapidly deteriorated by repeating the charge☐and☐discharge cycle.

In Comparative Example 3 in which the carbon coating treatment was not performed on both the first particle group as the small particle group and the second particle group as the large particle group, since the electrode density equivalent to that of the examples was able to be achieved by a predetermined pressing pressure, the capacity density was excellent. However, since the first particle group included in the first region did not have the carbon material layer, the active material particles were easily deteriorated by side reactions and the cycle life characteristics were deteriorated.

Regarding Examples 1 to 35, in Examples 1 to 3, 5 to 11, and 14 to 35 in which the median diameter is in the range of 1.0 μm to 2.0 μm, the electrode density tends to be increased by a predetermined pressing pressure, and thus the capacity density tends to be excellent. In addition, these examples also achieve the excellent capacity retention ratio. If the median diameter is excessively large, the number of active material particles having a small particle size is small, and thus the electrode density is less likely to be increased by a predetermined pressing pressure.

Regarding Examples 1 to 35, in Examples 1 to 16 and 18 to 35 in which the carbon coverage of the second particle group is in a range from 0% to 20%, the balance between capacity density and capacity retention ratio tends to be excellent.

In a case where the electrode density is in a range of 2.7 g/cm$^3$ to 2.85 g/cm$^3$, it is considered that the first particle group enters a gap of the second particle group, and as a result, the capacity density tends to be excellent.

For example, as described in Example 5, when the mode diameter of the first region is excessively small, both the capacity density and the capacity retention ratio tend to be deteriorated. This is presumably because there are many voids between the particles contained in the first region, and the electrode density is less likely to be improved. Moreover, it is considered that the specific surface area was increased and the side reaction with the electrolyte was promoted.

As described in Examples 4 and 13, when the mode diameter of the second region is excessively large, the capacity density tends to be deteriorated. The reason for this is considered that the electrode which includes the active material particles having a large particle size are not easily flattened by a predetermined pressing pressure, that is, the electrode density is hardly increased.

According to at least one embodiment and example described above, the electrode is provided. The electrode includes the current collector, and the active material-containing layer formed on the current collector and including active material particles. The active material particles include first active material particles including core particles containing a monoclinic niobium-titanium composite oxide, and a carbon material layer with which at least a part of surfaces of the core particles is coated. The active material particles further include second active material particles containing the monoclinic niobium-titanium composite oxide. The particle size distribution chart obtained by the laser diffraction scattering method for the active material particles includes the first region corresponding to the particle size of smaller than the median diameter d50 and the second region corresponding to the particle size of the median diameter d50 or larger. The first particle group included in the first region includes the first active material particles, and the second particle group included in the second region includes second active material particles. The carbon coverage of the first particle group is higher than the carbon coverage of the second particle group.

The electrode can realize a secondary battery having a high energy density and excellent cycle life characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode comprising:
    a current collector; and
    an active material-containing layer formed on the current collector and comprising active material particles, wherein
    the active material particles comprise first active material particles and second active material particles,
    the first active material particles comprise core particles containing monoclinic niobium-titanium composite oxide, and a carbon material layer with which at least a part of surfaces of the core particles is coated, the second active material particles comprise monoclinic niobium-titanium composite oxide, a particle size distribution chart obtained by a laser diffraction scattering method for the active material particles comprises a first region corresponding to a particle size of smaller than a median diameter d50 and a second region corresponding to a particle size of the median diameter d50 or larger, a first particle group comprised in the first region comprises the first active material particles, and a second particle group comprised in the second region comprises the second active material particles, and a carbon coverage of the first particle group is higher than a carbon coverage of the second particle group.

2. The electrode according to claim 1, wherein the carbon coverage of the first particle group is in a range from 30% to 100%.

3. The electrode according to claim 1, wherein the carbon coverage of the second particle group is in a range from 0% to 20%.

4. The electrode according to claim 1, wherein the carbon coverage of the first particle group is in a range from 60% to 100%.

5. The electrode according to claim 1, wherein the median diameter d50 is in a range from 1.0 µm to 2.0 µm.

6. The electrode according to claim 1, wherein in the particle size distribution chart, the first region has a mode diameter in a range from 0.15 µm to 2.0 µm.

7. The electrode according to claim 1, wherein in the particle size distribution chart, the second region has a mode diameter in a range from 2.5 µm to 10 µm.

8. The electrode according to claim 1, wherein an electrode density is in a range from 2.5 g/cm$^3$ to 2.9 g/cm$^3$.

9. The electrode according to claim 1, wherein the monoclinic niobium-titanium composite oxide comprised in the first active material particles and the monoclinic niobium-titanium composite oxide comprised in the second active material particles are, each independently, at least one selected from the group consisting of a composite oxide represented by General Formula $Li_xTi_{1-y}M1_yNb_{2-z}M2_zO_{7+\delta}$, and a composite oxide represented by General Formula $Li_xTi_{1-y}M3_{y+z}Nb_{2-z}O_{7-\delta}$, M1 is at least one selected from the group consisting of Zr, Si, and Sn, M2 is at least one selected from the group consisting of V, Ta, and Bi, and M3 is at least one selected from the group consisting of Mg, Fe, Ni, Co, W, Ta, and Mo, and x satisfies $0 \leq x \leq 5$, y satisfies $0 \leq y < 1$, z satisfies $0 \leq z < 2$, and δ satisfies $-0.3 \leq \delta \leq 0.3$.

10. A secondary battery comprising:
a positive electrode;
a negative electrode; and
an electrolyte, wherein
the negative electrode is the electrode according to claim 1.

11. A battery pack comprising the secondary battery according to claim 10.

12. The battery pack according to claim 11, further comprising:
an external power distribution terminal; and
a protective circuit.

13. The battery pack according to claim 11, further comprising:
a plurality of the secondary battery, wherein
the secondary batteries are electrically connected in series, in parallel, or in a combination of series connection and parallel connection.

14. A vehicle comprises the battery pack according to claim 11.

15. The vehicle according to claim 14, further comprising a mechanism configured to convert kinetic energy of the vehicle into regenerative energy.

* * * * *